(12) United States Patent
Baranowski

(10) Patent No.: US 9,873,603 B2
(45) Date of Patent: Jan. 23, 2018

(54) ROTARY FILLING APPARATUS AND METHODS

(71) Applicant: CAMPBELL SOUP COMPANY, Camden, NJ (US)

(72) Inventor: John Baranowski, Bensalem, PA (US)

(73) Assignee: Campbell Soup Company, Camden, NJ (US)

( * ) Notice: Subject to any disclaimer, the term of this patent is extended or adjusted under 35 U.S.C. 154(b) by 282 days.

(21) Appl. No.: 14/799,065

(22) Filed: Jul. 14, 2015

(65) Prior Publication Data
US 2016/0016775 A1   Jan. 21, 2016

Related U.S. Application Data

(60) Provisional application No. 62/025,317, filed on Jul. 16, 2014.

(51) Int. Cl.
*B67C 3/26* (2006.01)
*B65B 39/14* (2006.01)
(Continued)

(52) U.S. Cl.
CPC ............... *B67C 3/26* (2013.01); *B65B 3/323* (2013.01); *B65B 39/145* (2013.01); *B65G 21/22* (2013.01);
(Continued)

(58) Field of Classification Search
CPC ......... B67C 3/206; B67C 7/0046; B67C 3/26; B65B 3/323
(Continued)

(56) References Cited

U.S. PATENT DOCUMENTS 3,731,715 A    5/1973   Gageant et al.
3,850,345 A  * 11/1974  Merritt ................... B65B 3/323
                                                    141/146
(Continued)

FOREIGN PATENT DOCUMENTS

EP          0210687        2/1987
WO        2016011188       1/2016

OTHER PUBLICATIONS

"International Preliminary Report on Patentability," for PCT Application No. PCT/US2015/040625 dated Jan. 26, 2017 (13 pages).
(Continued)

*Primary Examiner* — Timothy L Maust
*Assistant Examiner* — Timothy P Kelly
(74) *Attorney, Agent, or Firm* — Pauly, DeVries Smith & Deffner LLC

(57) ABSTRACT

Embodiments of the invention include apparatus for filling containers and related methods. In an embodiment, the invention includes an apparatus for filling containers including a filler frame, a rotary turret assembly, a filler plenum assembly, piston assemblies, a cam track, and a fluid supply group. The cam track can include a first rising portion, a second rising portion, a first declining portion, a first flat portion, and a second declining portion. In some embodiments, the apparatus for filling containers can include a sensor and a lever actuator. The piston assemblies can move up and down within the plurality of hollow columns and can include a piston body, and a top hat assembly. The top hat assembly can include a cam contact member and a release lever. The top hat assembly can be configured to releasably engage the top of the piston body in some embodiments. The release lever can allow the piston body and the top hat assembly to release from one another when the release lever is engaged. In some embodiments, the apparatus for filling containers can include a container conveyor system includ-
(Continued)

ing an infeed timing screw, a discharge timing screw, and a container elevation system. In an embodiments the apparatus can include a fluid supply group can include a liquid supply tank, a supply conduit, a reclaim trough, a reclaim conduit, a pump, a plenum return conduit, and a pumped return conduit. Other embodiments are included herein.

13 Claims, 21 Drawing Sheets

(51) Int. Cl.
  *B65G 21/22* (2006.01)
  *B65B 3/32* (2006.01)
  *B67C 3/20* (2006.01)
  *B67C 7/00* (2006.01)

(52) U.S. Cl.
  CPC ............ *B67C 3/206* (2013.01); *B67C 7/0046* (2013.01); *B65G 2812/02069* (2013.01)

(58) Field of Classification Search
  USPC .................................................. 141/146, 147
  See application file for complete search history.

(56) References Cited

U.S. PATENT DOCUMENTS

| | | | |
|---|---|---|---|
| 4,244,404 A | 1/1981 | Brockner et al. | |
| 4,627,475 A | 12/1986 | Von et al. | |
| 4,635,689 A | 1/1987 | Graffin et al. | |
| 4,838,326 A | 6/1989 | Colacci et al. | |
| 5,280,815 A * | 1/1994 | Jones ...................... | B65B 3/323 141/147 |
| 5,653,092 A | 8/1997 | Gorby et al. | |

OTHER PUBLICATIONS

"Invitation to Pay Additional Fees," for PCT/US2015/040625 dated Sep. 30, 2015 (7 pages).
"International Search Report and Written Opinion," for PCT/US2015/040625 dated Dec. 8, 2015 (22 pages).

* cited by examiner

ROTARY FILLING APPARATUS AND METHODS

This application claims the benefit of U.S. Provisional Application No. 62/025,317, filed Jul. 16, 2014, the content of which is herein incorporated by reference in its entirety.

FIELD OF THE INVENTION

The present invention relates to apparatus for filling containers and related methods. More specifically, the present invention relates to rotary filling apparatus and related methods.

BACKGROUND OF THE INVENTION

Containers of various sorts including bottles and cans and jars, etc., are commonly filled with liquid type products in a production line by a rotary type piston filling machines. In general, containers arrive on a conveyor line and are successively applied onto a turret in underlying relation with a revolving piston type filler. The filler has a piston moving in an upright cylinder, and the piston is reciprocated upwardly and downwardly during revolving of the filler and turret so that the liquid product is drawn into the piston and is subsequently expelled from the piston into the container being filled. The amount of liquid product that is supplied into the container in the filling operation is measured by the magnitude of the piston movement in the cylinder, and the size of the cylinder.

SUMMARY OF THE INVENTION

Embodiments of the invention include apparatus for filling containers and related methods. In an embodiment, the invention includes an apparatus for filling containers. The apparatus for filling containers can include a filler frame, a rotary turret assembly, a filler plenum assembly, piston assemblies, a cam track, and a fluid supply group. The rotary turret assembly can include a rotary base and a plurality of hollow columns. The plurality of hollow columns can be mounted on the rotary base and arranged in a circle. The piston assemblies can move up and down within the plurality of hollow columns. The piston assemblies can further include a cam contact member. Rotation of the rotary turret assembly causes the cam contact member to move over a surface of the cam track causing vertical movement of the piston assemblies relative to the plurality of hollow columns.

In various embodiments the cam track can include a first rising portion, a second rising portion, a first declining portion, a first flat portion, and a second declining portion. The first rising portion can correspond to a filling phase. The second rising portion can correspond to an overfilling phase. The first declining portion can correspond to a purging phase. The first flat portion can correspond to a hold phase. The second declining portion can correspond to a dispensing phase.

In an embodiment, the invention includes a method for filling containers. The method for filling containers can include rotating a rotary turret assembly, the rotary turret assembly comprising a rotary base and a plurality of hollow columns mounted on the rotary base and arranged in a circle. The method can further include contacting a cam contact member against a cam track to cause piston assemblies disposed within the hollow columns to move up and down, drawing a food material into a bottom portion of the hollow columns when the piston assemblies move up. The method can further include dispensing the food material into a container when the piston assemblies move down. In various embodiments, the amount of the food material drawn into the hollow column exceeds the amount ultimately dispensed into the container.

In an embodiment, the invention includes an apparatus for filling containers. The apparatus for filling containers can include a filler frame, a rotary turret assembly, a filler plenum assembly, piston assemblies, a sensor, a lever actuator, a cam track, and a fluid supply group. The rotary turret assembly can include a rotary base and a plurality of hollow columns. The piston assemblies can move up and down within the plurality of hollow columns. The piston assemblies can include a piston body and a top hat assembly. The top hat assembly can include a cam contact member and a release lever.

The top hat assembly can be configured to releasably engage the top of the piston body. The release lever can allow the piston body and the top hat assembly to release from one another when the release lever is engaged. The sensor can detect the presence or absence of a container to be filled. The lever actuator can be configured to contact the release lever when the sensor indicates that a container to be filled is absent. Upon rotation of the rotary turret assembly, the cam contact member moves over a surface of the cam track. However, because the cam contact member is operably connected to the top hat assembly, rotation of the rotary turret assembly only causes vertical movement of the piston body only if the top hat assembly is connected to the piston body.

In an embodiment, the invention includes a method for filling containers. The method for filling containers can include rotating a rotary turret assembly, the rotary turret assembly comprising a rotary base and a plurality of hollow columns mounted on the rotary base and arranged in a circle. The method can further include detecting whether a container to be filled is aligned with a particular hollow column and engaging a release lever that allows a top hat assembly to release from a piston body assembly if a container is not detected. The method can further include contacting a cam contact member operably connected to the top hat assembly against a cam track to cause the top hat assembly disposed within the hollow columns to move up and down. The method can further include drawing a food material into a bottom portion of the hollow columns when the piston body assemblies move up if the top hat assembly is not released from the piston body assembly. The method can also include dispensing the food material into a container when the piston body assemblies move down if the top hat assembly is not released from the piston body assembly.

In an embodiment, the invention includes an apparatus for filling containers. The apparatus for filling containers can include a filler frame, a rotary turret assembly, and a container conveyor system. The container conveyor system can be for supplying empty containers to the rotary turret assembly and conveying filled containers away from the rotary turret assembly. The container conveyor system can include an infeed timing screw, a discharge timing screw, and a container elevation system. The container elevation system can be used to raise or lower at least a portion of a track or rail so that the top height of the containers (such as cans) can be adjusted to be the correct height for the rotary turret assembly. The container elevation system can include a rail brace and a brace actuator. The brace actuator can be used to raise or lower the height of the rail brace. A rail can be mounted on or adjacent to the rail brace. The containers to be filled can move along the rail. In some embodiments, the container elevation system can be disposed under a portion of the infeed timing screw and the discharge timing screw.

In an embodiment, the invention includes a method for filling containers. The method for filling containers can include rotating a rotary turret assembly, the rotary turret assembly comprising a rotary base and a plurality of hollow columns mounted on the rotary base and arranged in a circle. The method can further include feeding containers to be filled into an infeed timing screw, passing the containers over a container rail, wherein the container rail is disposed adjacent the infeed timing screw, adjusting the height of the containers and container rail relative to the rotary turret.

In an embodiment, the invention includes an apparatus for filling containers. The apparatus for filling containers can include a filler frame, a rotary turret assembly, a filler plenum assembly, and a fluid supply group. The filler plenum assembly can include a plenum. The fluid supply group can include a liquid supply tank, a supply conduit, a reclaim trough, a reclaim conduit, a pump, a plenum return conduit, and a pumped return conduit. The filler plenum assembly can be underlying a portion of the rotary turret assembly. The plenum can be in fluid communication with the plurality of hollow columns for a portion of each rotation of the rotary turret assembly. The fluid supply group can be in fluid communication with the plenum. The supply conduit can provide fluid communication between the liquid supply tank and the plenum. The reclaim trough can be adjacent to the plenum. The reclaim conduit can provide fluid communication between the reclaim trough and the pump. The plenum return conduit can provide fluid communication between the plenum outlet and the pump. The pumped return conduit can provide fluid communication between the pump and the liquid supply tank.

The components of the fluid supply group can provide for a closed circuit fluid supply in that food materials can pass from the liquid supply tank through the supply conduit to the plenum. Food materials that are not drawn into the hollow columns of the rotary turret assembly can then pass out of the plenum through a plenum return conduit to a pump. Also, in some embodiments, food materials recovered through a reclaim trough can pass through a reclaim conduit to the pump. The pump can cause the food material to pass through a pumped return conduit back to the liquid supply tank either directly or indirectly. In some embodiments, this circuit can be operative even when the rotary turret is not rotating and filling containers such that food material can be recirculated and kept in proper condition for being filled into containers during temporary stoppages of the rotary turret.

In an embodiment, the invention includes a method for filling containers. The method for filling containers can include rotating a rotary turret assembly, the rotary turret assembly comprising a rotary base and a plurality of hollow columns mounted on the rotary base and arranged in a circle. The method can further include delivering a food product to a plenum disposed under a portion of the rotary turret assembly by conveying the food product from a liquid supply tank through a supply conduit to the plenum. The method can further include drawing a first portion of the food product from the plenum into the hollow columns for dispensing into containers to be filled. The method can further include collecting a second portion of the food product disposed in the plenum and conveying the collected food product through an outlet in the plenum and to a pump. The method can further include conveying the collected food product from the pump back to the liquid supply tank.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

BRIEF DESCRIPTION OF THE FIGURES

Aspects herein may be more completely understood in connection with the following drawings, in which.

Figure 1:
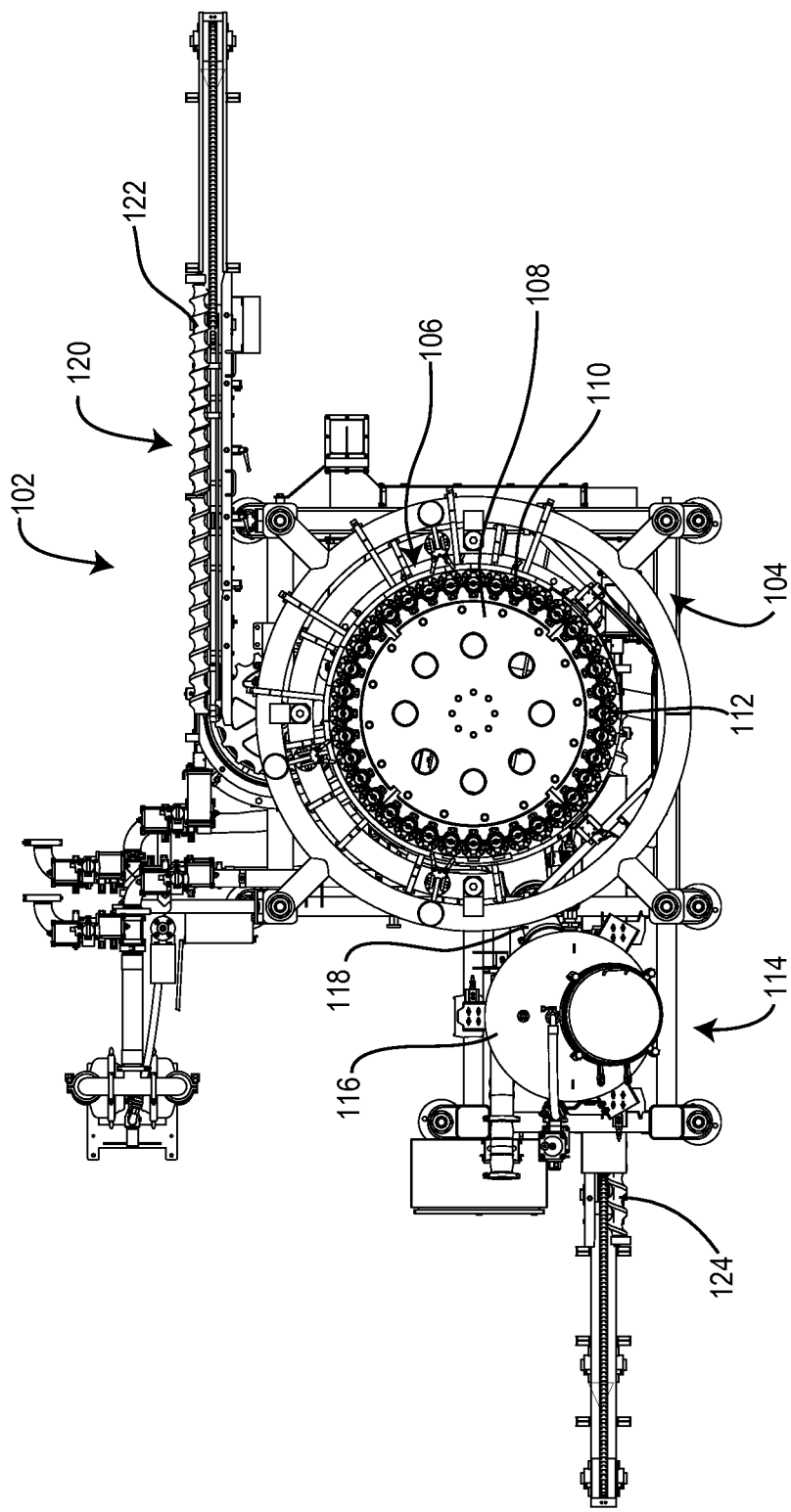
FIG. 1 is a schematic top view of an apparatus for filling containers in accordance with various embodiments herein.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

The embodiments of the present invention described herein are not intended to be exhaustive or to limit the invention to the precise forms disclosed in the following detailed description. Rather, the embodiments are chosen and described so that others skilled in the art can appreciate and understand the principles and practices of the present invention.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Embodiments herein include apparatus for filling containers that can achieve various operational advantages. By way of example, in some embodiments, the ability to fill a container with a food product that is predominantly a liquid but also includes pieces of particulate material such as pieces of meat, vegetables, garnish, or condiments and the like, can be achieved with increased consistency regarding the total amount of the food product filled, the relative amounts of the particular material to the liquid portion, or both. In some embodiments, the efficiency of the filling operation in terms of how much product is actually deposited into containers versus how much product is wasted can be improved. In some embodiments, the ability to quickly reconfigure the apparatus to accommodate containers of different heights is greatly improved. In some embodiments, the filling apparatus can use a closed loop product supply approach and in some cases can also recirculate the food product through a portion of the system when the filling operation temporarily ceases. This can lead to reduced waste by eliminating or reducing the circumstances in which food product might otherwise have to be purged from the system. It will be appreciated that not every embodiment included within the scope herein will achieve all of these operational advantages. However, many embodiments can achieve one or more these operational advantages.

Food products that can be filled into containers in accordance with various embodiments herein can include liquid food products or food products that include a liquid portion such that they are flowable. Exemplary food products can include, but are not limited to, soups, stews, sauces, juices, beverages, and the like, and concentrates of any of these. In some embodiments, the food product includes a substantial proportion of particulates having a diameter of greater than 1 millimeter. In some embodiments, the food product includes at least about 1 wt. % of particulates having a diameter of greater than 1 millimeter. In some embodiments, the food product includes at least about 2 wt. % of particulates having a diameter of greater than 1 millimeter. In some embodiments, the food product includes at least about 5 wt. % of particulates having a diameter of greater than 1 millimeter. In some embodiments, the food product includes at least about 10 wt. % of particulates having a diameter of greater than 1 millimeter.

It will be appreciated that containers that are filled in accordance with various embodiments can be of many different types. In some embodiments, the container can be formed of one or more metals, polymers, glasses, ceramics, cellulosic materials, or a combination thereof. The containers can include, but are not limited to, cans, jars, bottles, pouches, and the like.

Referring now to FIG. 1, the apparatus for filling containers 102 can include a filler frame 104, a rotary turret assembly 106, piston assemblies 112, and a fluid supply group 114. The rotary turret assembly 106 includes a rotary base 108 and a plurality of hollow columns 110. The fluid supply group 114 includes a liquid supply tank 116 and a supply conduit 118. The apparatus for filling containers 102 can include a container conveyor system 120. The container conveyor system 120 can include an infeed timing screw 122 and a discharge timing screw 124.

In operation, at a high level, the container conveyor system provides containers to the rotary turret assembly 106 for filling and then conveys them away after they are filled. The rotary turret assembly 106 pulls a food product or material for filling into the hollow columns 110 and then dispenses the food product into containers as the rotary turret assembly 106 rotates. The fluid supply group 114 supplies the food product to the rotary turret assembly 106.

Figure 2:
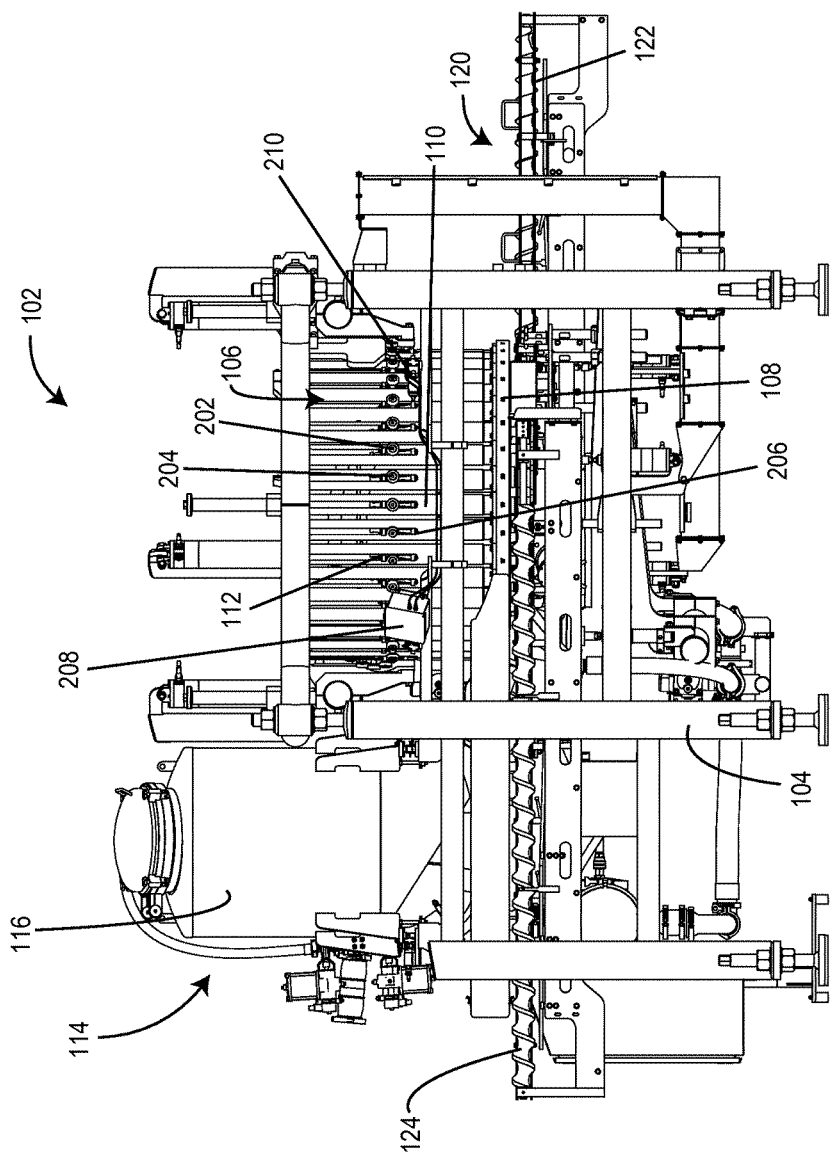
FIG. 2 is a schematic side view of an apparatus for filling containers in accordance with various embodiments herein.

Referring now to FIG. 2, the apparatus for filling containers 102 can include a filler frame 104, a rotary turret assembly 106, piston assemblies 112, and a fluid supply group 114. The rotary turret assembly 106 includes a rotary base 108 and a plurality of hollow columns 110. The piston assemblies 112 include a cam contact member 202. The cam contact member 202 can include a cam roller 204. FIG. 2 also shows a release lever 206. The apparatus for filling containers 102 can include sensor 208. The apparatus for filling containers 102 can include lever actuator 210. Aspects of the release lever 206, sensor 208, and lever actuator 210 will be described in greater detail below. The fluid supply group 114 includes a liquid supply tank 116 and a supply conduit 118. The apparatus for filling containers 102 can include a container conveyor system 120 including an infeed timing screw 122 and a discharge timing screw 124.

Figure 3:
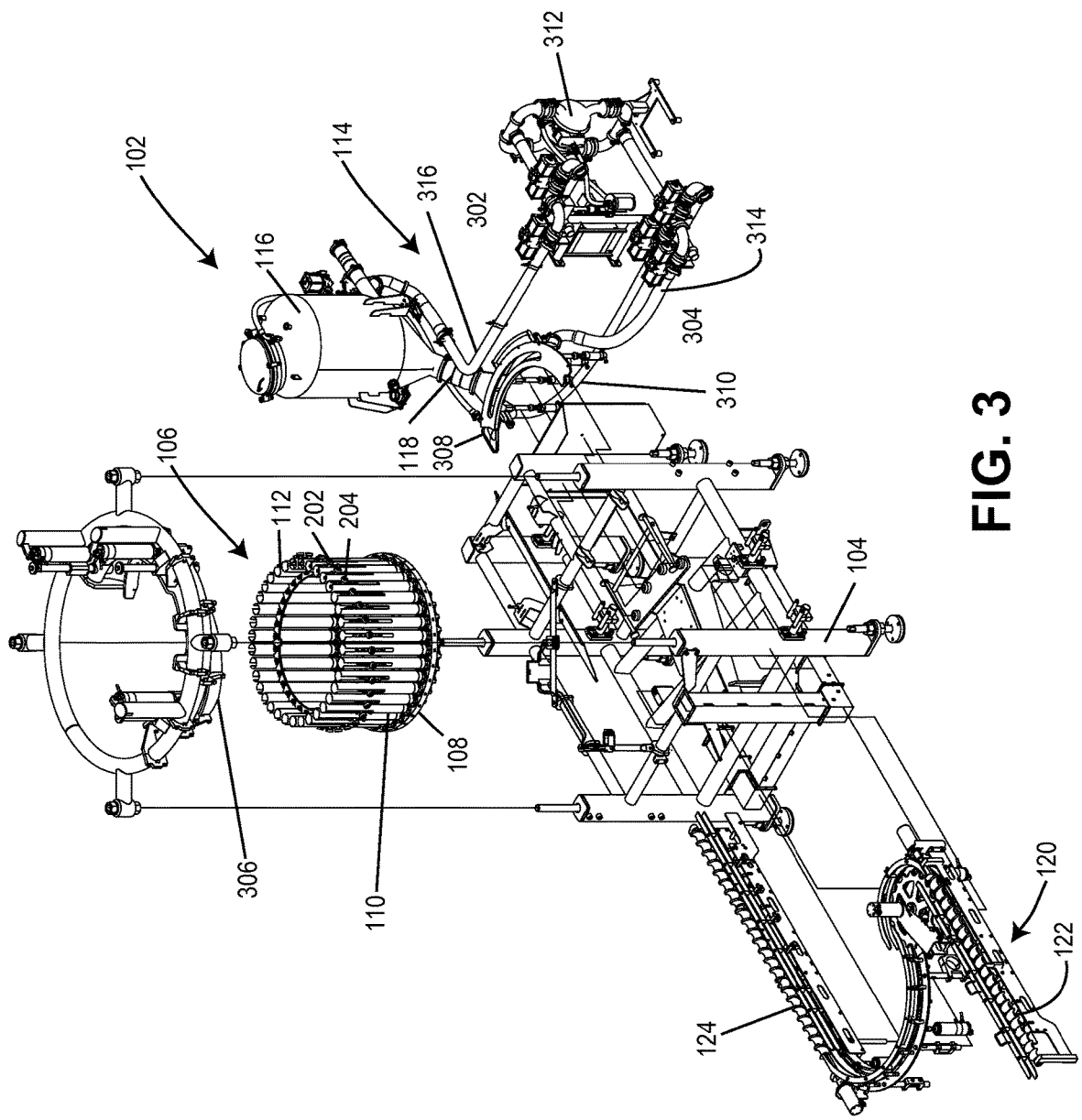
FIG. 3 is an exploded perspective view of an apparatus for filling containers in accordance with various embodiments herein.

Referring now to FIG. 3, the apparatus for filling containers 102 can include a filler frame 104, a rotary turret assembly 106, a filler plenum assembly 302, piston assemblies 112, a cam track 306, and a fluid supply group 114. The rotary turret assembly 106 includes a rotary base 108 and a plurality of hollow columns 110. The filler plenum assembly 302 includes a plenum 304. The piston assemblies 112 include a cam contact member 202. The fluid supply group 114 includes a liquid supply tank 116 and a supply conduit 118. The cam contact member 202 can include cam roller 204. The apparatus for filling containers 102 can include a container conveyor system 120 including an infeed timing screw 122 and a discharge timing screw 124. The fluid supply group 114 can include a reclaim trough 308, a reclaim conduit 310, and a pump 312. The fluid supply group 114 can also include a plenum return conduit 314 and a pumped return conduit 316.

Figure 4:
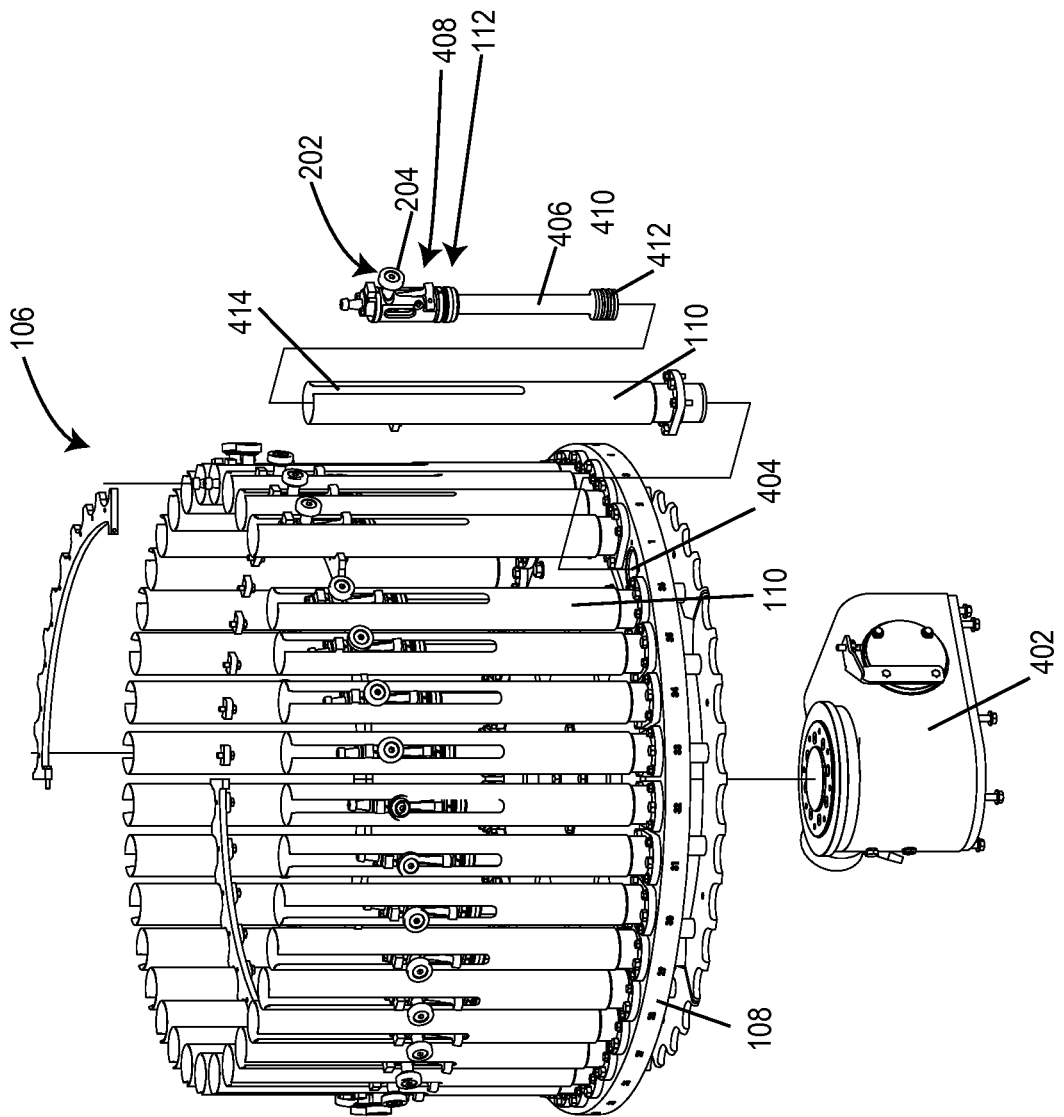
FIG. 4 is a partially exploded perspective view of a rotary turret assembly in accordance with various embodiments herein.

Referring now to FIG. 4, the rotary turret assembly 106 includes a rotary base 108 and a plurality of hollow columns 110. The cam contact member 202 can include a cam roller 204. The apparatus for filling containers 102 can include motor 402. It will be appreciated that the motor 402 can also include components such as a housing, gears, control circuitry, and the like. The rotary base 108 can include a plurality of apertures 404 aligned with the plurality of hollow columns 110. The piston assemblies 112 can include a piston body 406 and a top hat assembly 408. The top hat assembly 408 includes a cam contact member 202. The piston body 406 can include a bottom 410 portion. The piston body 406 can include piston rings 412 disposed around the bottom 410. The plurality of hollow columns 110 can also include a channel 414.

As can be seen in FIG. 4, the channel 414 extends part of the way down the hollow column 110 from the top. The channel 414 can allow for an interface between the piston assembly 112, which is largely disposed within the hollow column, and the cam track 306, which is outside the hollow column.

Figure 5:
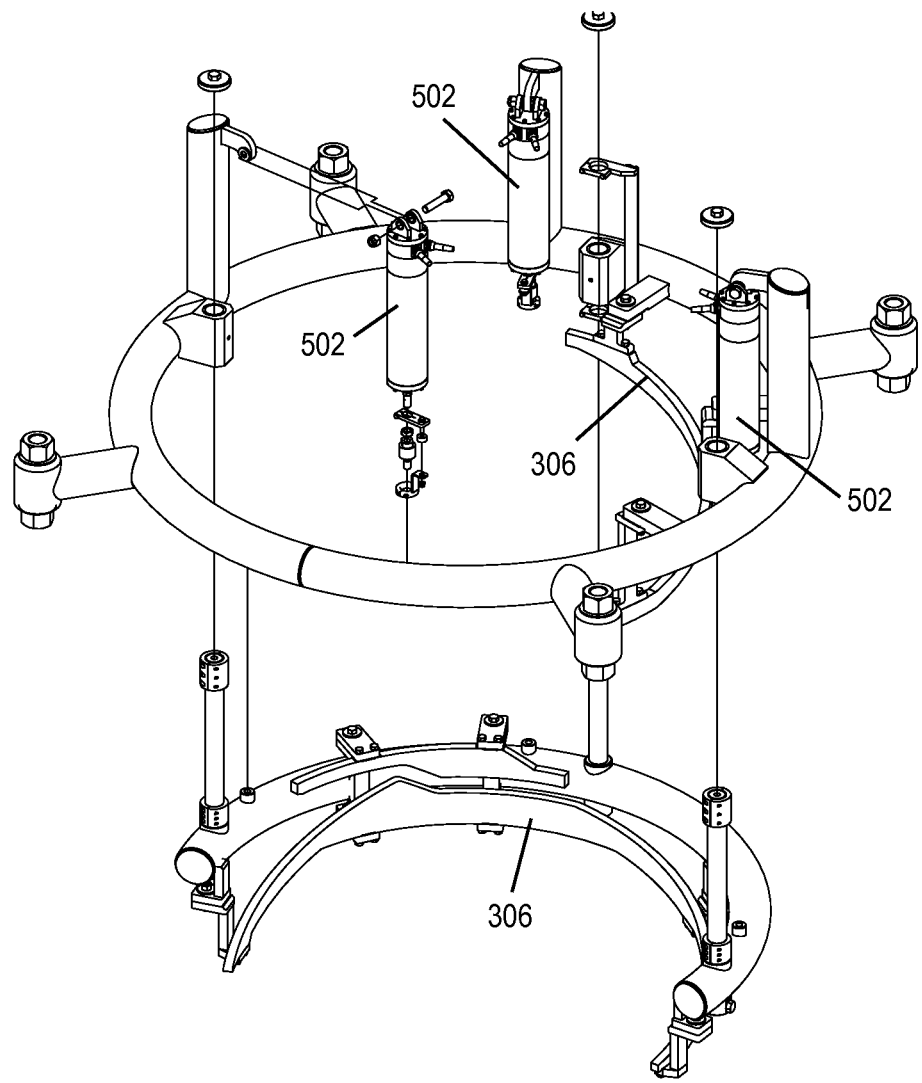
FIG. 5 is an exploded perspective view of a cam track assembly in accordance with various embodiments herein.

Referring now to FIG. 5, the apparatus for filling containers includes a cam track 306. The apparatus for filling containers 102 can include a cam track actuator 502. The cam track 306 can define a particular vertical profile. The vertical profile of the cam track 306 can define how the piston assemblies 112 move up and down within the hollow columns 110 as the rotary turret assembly 106 rotates. As such, the vertical profile of the cam track 306 can dictate the amount of the food material that is drawn into the hollow columns 110 and then later dispensed as the rotary turret assembly 106 rotates.

Figure 6:
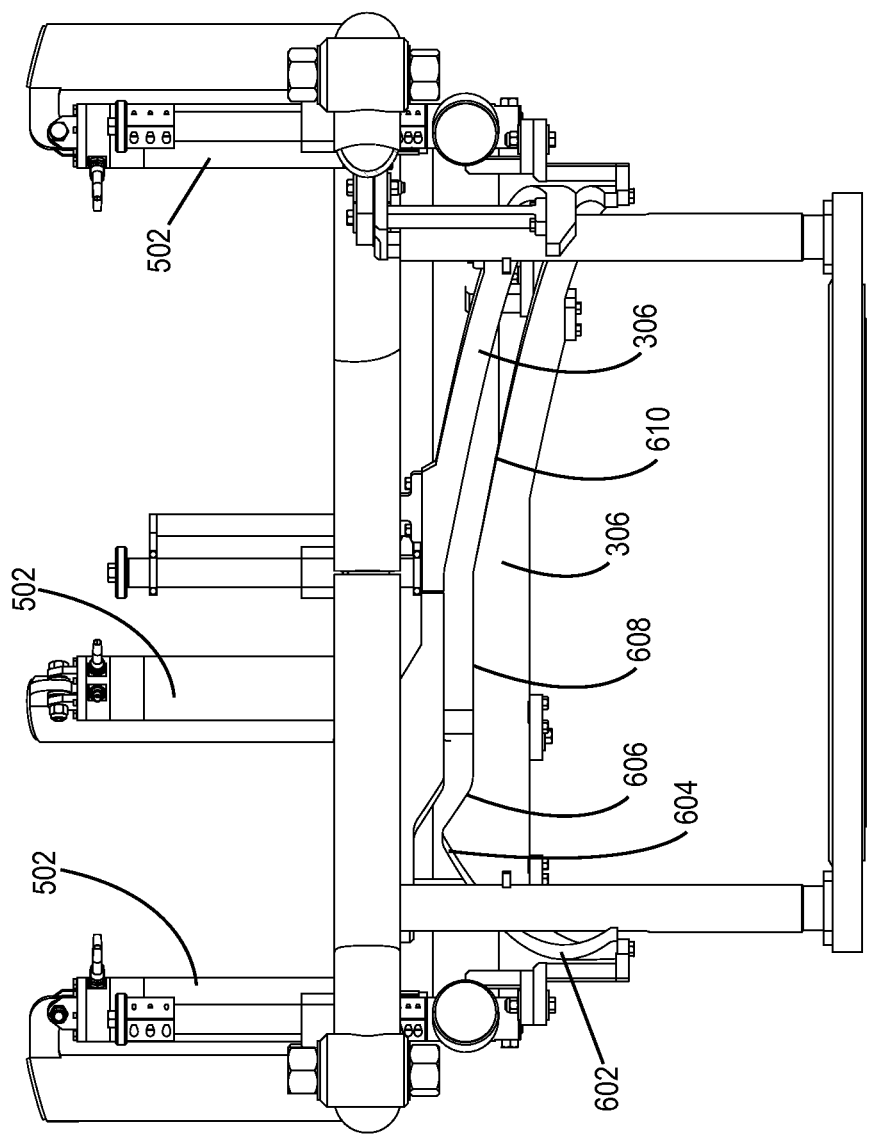
FIG. 6 is a side view of a cam track assembly in accordance with various embodiments herein.

Referring now to FIG. 6, a side view the cam track 306 is shown. The cam track 306 can include a top bar 307 and a lower bar 309. In some embodiments, the cam track 306 could include only the top bar or the bottom bar. The profile of the cam track 306 includes a first rising portion 602, a second rising portion 604, a first declining portion 606, a first flat portion 608, and a second declining portion 610. The first rising portion can correspond to a filling phase. The second rising portion can correspond to an overfilling phase. The first declining portion can correspond to a purging phase. The first flat portion can correspond to a hold phase. The second declining portion can correspond to a dispensing phase. Further aspects of these phases are described in greater detail below.

The apparatus for filling containers 102 can also include one or more cam track actuators 502. The cam track actuator 502 can be a linear actuator or another type of actuator. The actuator can operate electrically, hydraulically, magnetically, mechanically, or can operate based on a combination thereof. The cam track actuator 502 can be used to raise or lower the cam track 306, or a portion thereof, with respect to the rotary turret assembly 106. As such, the cam track actuator 502 can be used to change the volumes of food material that are drawn up into the hollow columns as might be periodically necessary, such as when the apparatus is reconfigured to fill containers of a different size.

Figure 7:
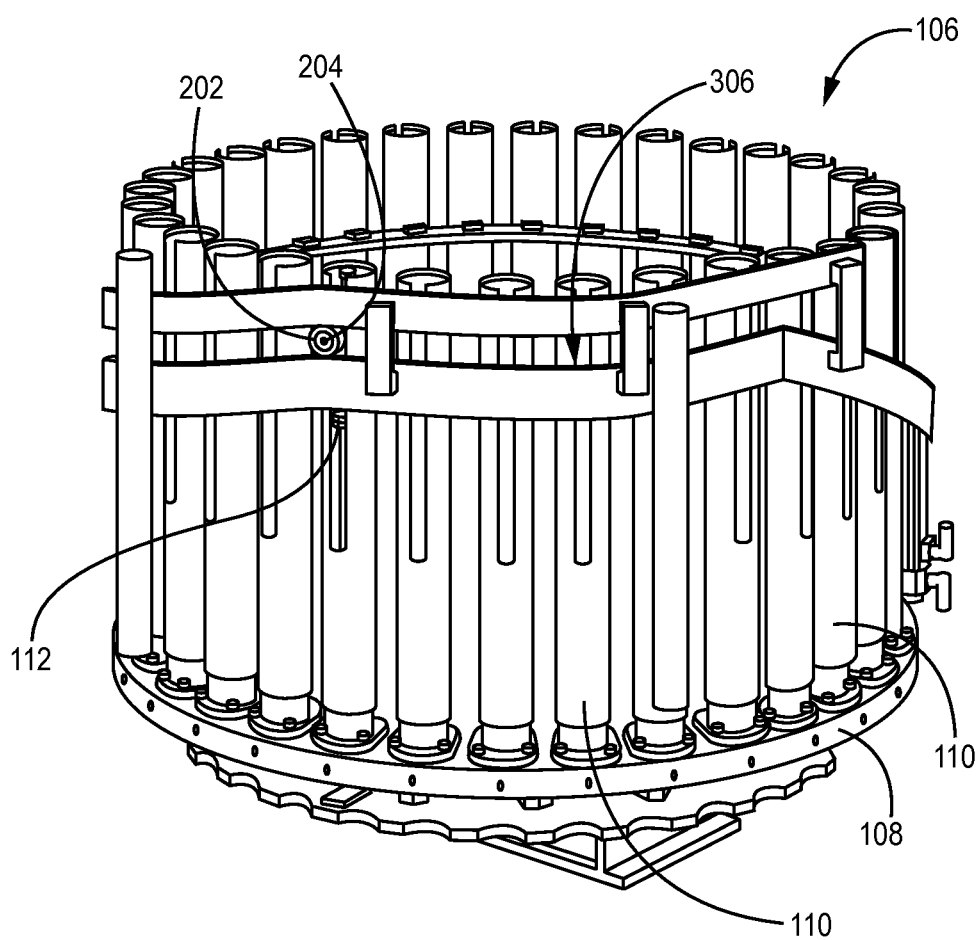
FIG. 7 is a schematic view of a cam track and a rotary turret assembly in accordance with various embodiments herein.

Referring now to FIG. 7, the rotary turret assembly 106 includes a rotary base 108 and a plurality of hollow columns 110. The piston assemblies 112 include a cam contact member 202, and a cam track 306. The cam contact member 202 can include a cam roller 204. The cam roller 204 can roll against the cam track 306 as it passes there over. However, in other embodiments, the cam contact member 202 could take on other forms such as a cam slider or other type of track follower.

Figure 8:
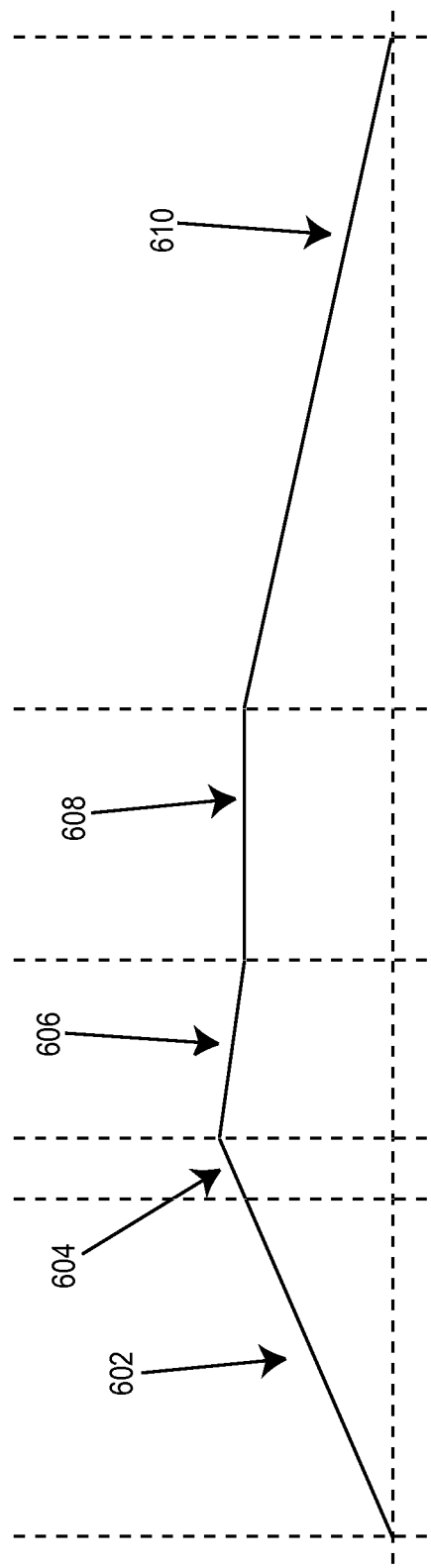
FIG. 8 is a schematic view of a cam track profile in accordance with various embodiments herein.

Referring now to FIG. 8, the cam track 306 includes a first rising portion 602, a second rising portion 604, a first declining portion 606, a first flat portion 608 and a second declining portion 610. As described above, the first rising portion can correspond to a filling phase. The second rising portion can correspond to an overfilling phase. The first declining portion can correspond to a purging phase. The first flat portion can correspond to a hold phase. The second declining portion can correspond to a dispensing phase.

In some embodiments, the first rising portion wherein vertical distance covered by the first rising portion is the same as the vertical distance covered by the second declining portion. In some embodiments, the vertical distance covered by the first rising portion is at least about 0.25 inches. In some embodiments, the vertical distance covered by the first rising portion is less than 18 inches. In some embodiments, the vertical distance covered by the first rising portion is from about 0.25 inches to about 12 inches. In some embodiments, the second rising portion wherein vertical distance covered by the second rising portion is the same as the vertical distance covered by the first declining portion. In some embodiments, the vertical distance covered by the second rising portion is at least about 0.5 inches, at least about 1.0 inches, at least about 1.5 inches, at least about 2.0 inches, at least about 2.5 inches, at least about 3.0 inches, or at least about 4.0 inches.

In some embodiments, the horizontal distance covered by the first flat portion is about 5 to about 95 percent of the horizontal distance covered by the first rising portion and the second rising portion combined. In some embodiments, the horizontal distance covered by the first flat portion is about 20 to about 80 percent of the horizontal distance covered by the first rising portion and the second rising portion combined. In some embodiments, the horizontal distance covered by the first flat portion is about 30 to 50 percent of the horizontal distance covered by the first rising portion and the second rising portion combined.

In some embodiments, the vertical distance covered by the first declining portion is equal to at least about 1% of the vertical distance covered by the second declining portion. In some embodiments, the vertical distance covered by the first declining portion is equal to at least about 5% of the vertical distance covered by the second declining portion. In some embodiments, the vertical distance covered by the first declining portion is equal to at least about 10% of the vertical distance covered by the second declining portion. In some embodiments, the vertical distance covered by the first declining portion is equal to at least about 20% of the vertical distance covered by the second declining portion. In some embodiments, the vertical distance covered by the first declining portion is equal to at least about 50% of the vertical distance covered by the second declining portion. In some embodiments, the vertical distance covered by the first declining portion is equal to at least about 100% of the vertical distance covered by the second declining portion. In some embodiments, the vertical distance covered by the first declining portion is equal to at least about 150% of the vertical distance covered by the second declining portion. In some embodiments, the vertical distance covered by the first declining portion is greater than the vertical distance covered by the second declining portion.

In some embodiments, the first rising portion and the second rising portion together cause the piston to move up in the plurality of hollow columns such that a volume of about 50 ml to about 3000 ml of a liquid food material is drawn into a bottom portion of the plurality of hollow columns. In some embodiments, the first rising portion and the second rising portion together cause the piston to move up in the plurality of hollow columns such that a volume of about 300 ml to about 1000 ml of a liquid food material is drawn into a bottom portion of the plurality of hollow columns.

In some embodiments, the slope of the first rising portion is greater than the absolute value of the slope of the second declining portion. As such, in some embodiments, the rate of drawing food product into the hollow columns can be faster than the rate of dispensing the food product out of the hollow columns into containers. In some embodiments, the slope of the first rising portion can be the same as, or different from, the slope of the second rising portion. In some embodiments, the slope of the first declining portion can be the same as, or different from, the slope of the second declining portion.

Figure 9:
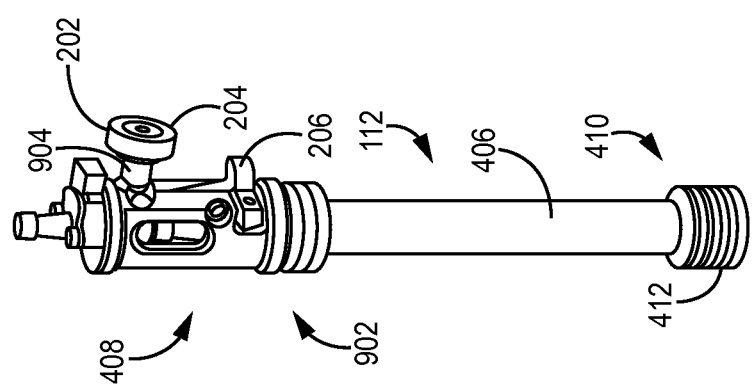
FIG. 9 is a schematic view of a piston assembly in accordance with various embodiments herein.

Referring now to FIG. 9, the piston assemblies 112 include a cam contact member 202. The cam contact member 202 can include a cam roller 204. The piston body 406 includes a top 902. The top hat assembly 408 includes a cam contact member 202 and a release lever 206. The piston body 406 can include a bottom 410. The piston body 406 can include piston rings 412. The piston assemblies 112 can include a shaft 904.

Figure 10:
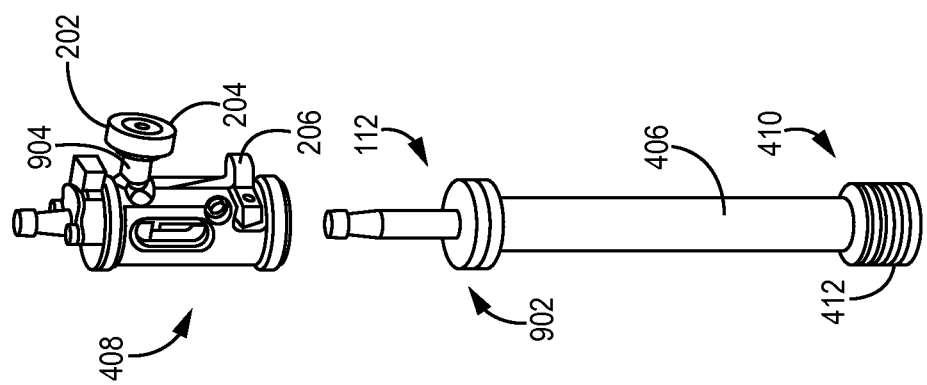
FIG. 10 is a piston assembly with the top hat assembly removed from the piston body in accordance with various embodiments herein.

The top hat assembly 408 can separate from the piston body 406. In particular, actuating the release lever 206 can allow the top hat assembly 408 to release from the piston body 406. Referring now to FIG. 10, a view is shown of the top hat assembly 408 released from the piston body 406. It will be appreciated however that the release of the top hat assembly 408 from the piston body 406 can be triggered in various ways. By way of example, in some embodiments, the release of the top hat assembly 408 can be triggered pneumatically, such as with a shaft that extends under pneumatic force to hit a lever or trigger on the top hat assembly. In some embodiments, the release of the top hat assembly 408 can be triggered using coil gun technology, such as with a shaft that extends using force provided by a coil gun in order to hit a lever or trigger on the top hat assembly.

Figure 11:
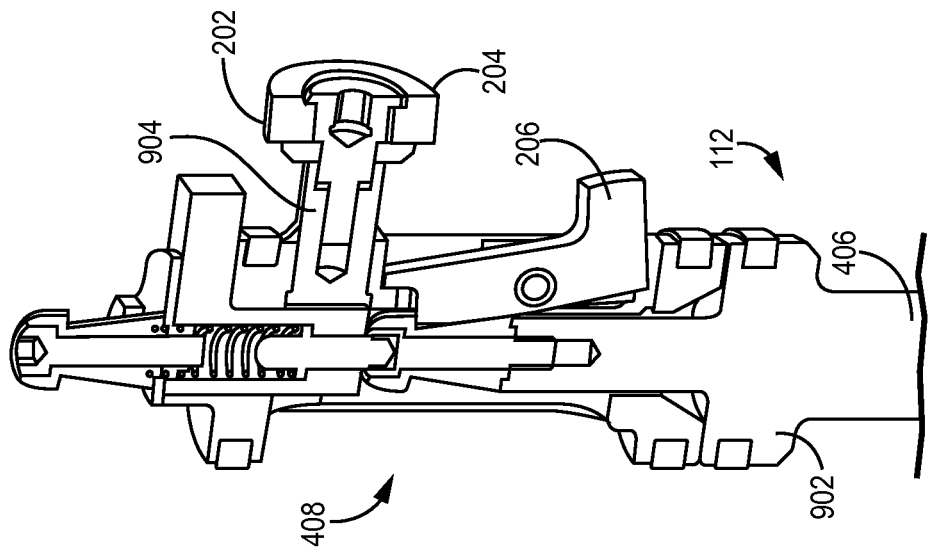
FIG. 11 is a cross-sectional schematic view of a portion of a piston assembly in accordance with various embodiments herein.

Referring now to FIG. 11, a cross-sectional schematic view of a portion of a piston assembly in accordance with various embodiments herein is shown. The piston assemblies 112 include a cam contact member 202. The cam contact member 202 can include a cam roller 204. The piston body 406 includes a top 902. The top hat assembly 408 includes a cam contact member 202 and a release lever 206. The piston assemblies 112 can include a shaft 904.

Figure 12:
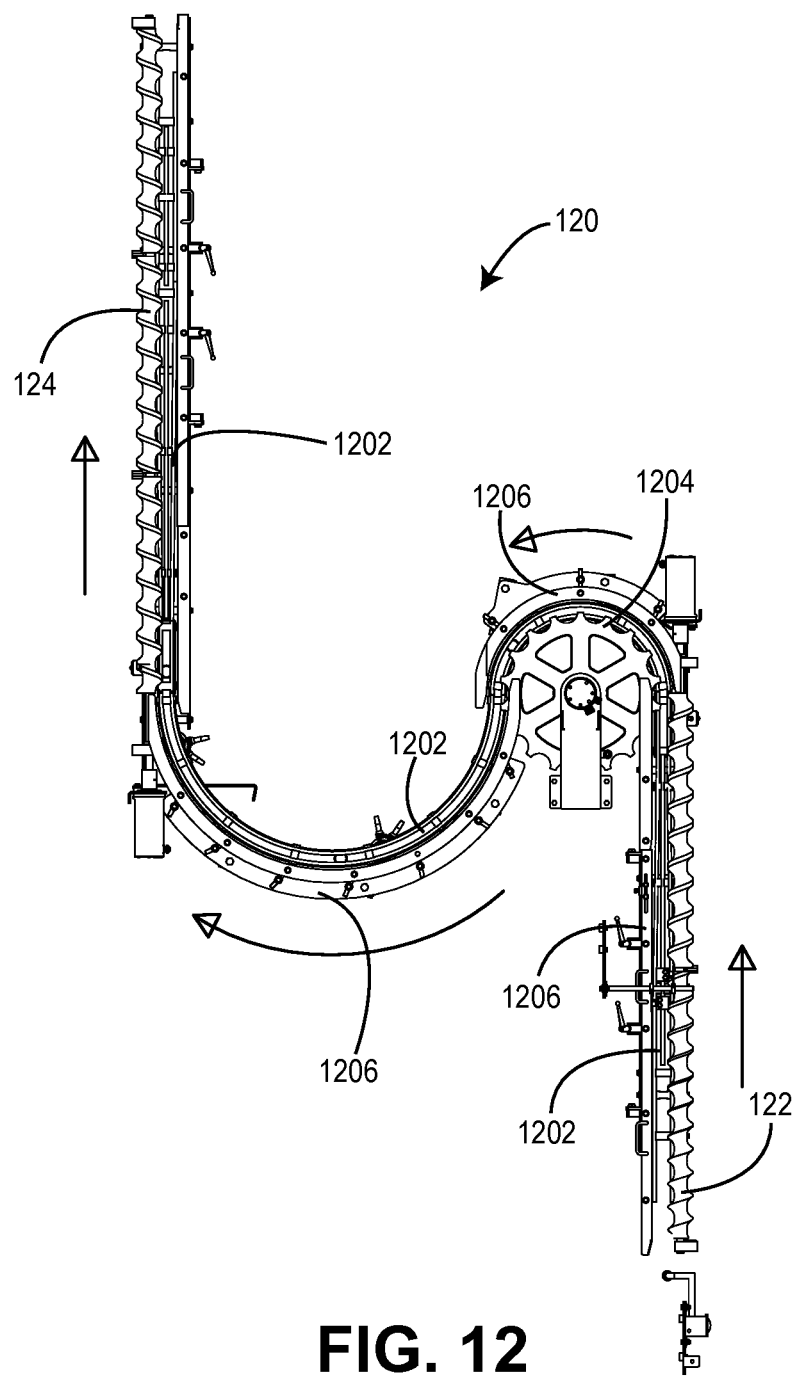
FIG. 12 is a schematic top view of a container conveyor system in accordance with various embodiments herein.

Referring now to FIG. 12, the apparatus for filling containers 102 can include a container conveyor system 120. The container conveyor system 120 can include an infeed timing screw 122 and a discharge timing screw 124. The container conveyor system 120 can also include a container elevation system 1302. The container elevation system 1302 can include a container rail 1202. The container conveyor system 120 can include a reversing wheel 1204 and a container guide 1206.

Figure 13:
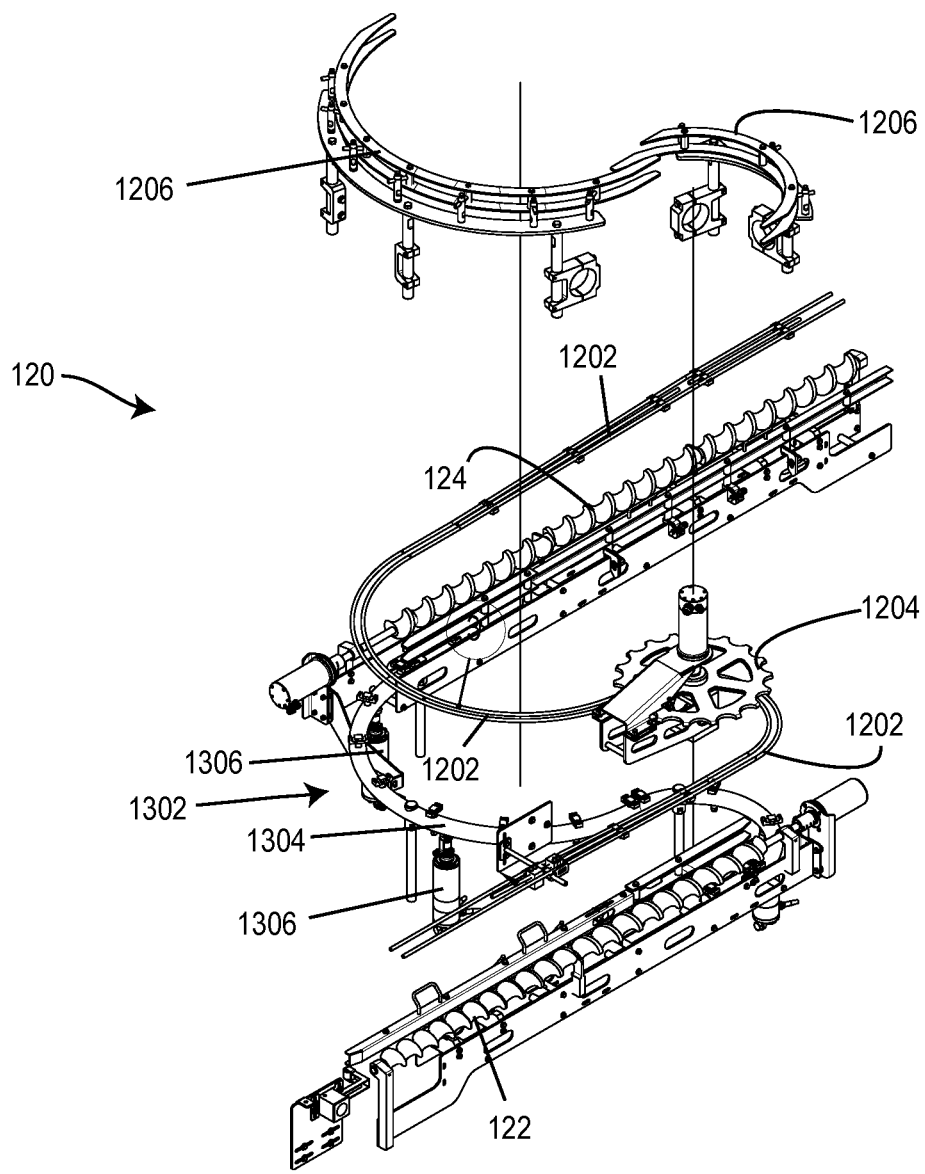
FIG. 13 is an exploded perspective view of a container conveyor system in accordance with various embodiments herein.

Referring now to FIG. 13, the apparatus for filling containers 102 can include a container conveyor system 120. The apparatus for filling containers 102 can include an infeed timing screw 122 and a discharge timing screw 124. The container elevation system 1302 includes a rail brace 1304 and one or more brace actuators 1306. In addition, the brace actuator 1306 can be operatively connected to the rail brace 1304 such that the brace actuator 1306 can cause vertical movement of the rail brace 1304. The brace actuator 1306 can be a linear actuator or another type of actuator. The actuator can operate electrically, hydraulically, magnetically, mechanically, or can operate based on a combination thereof. The container elevation system 1302 can also include a container rail 1202 (or track or belt). The container conveyor system 120 can also include a reversing wheel 1204 and one or more container guide 1206. The reversing wheel 1204 can be used to change the direction of movement of the containers. The container guide 1206 can be used to aid in keeping the containers on the container rail 1202.

Figure 14:
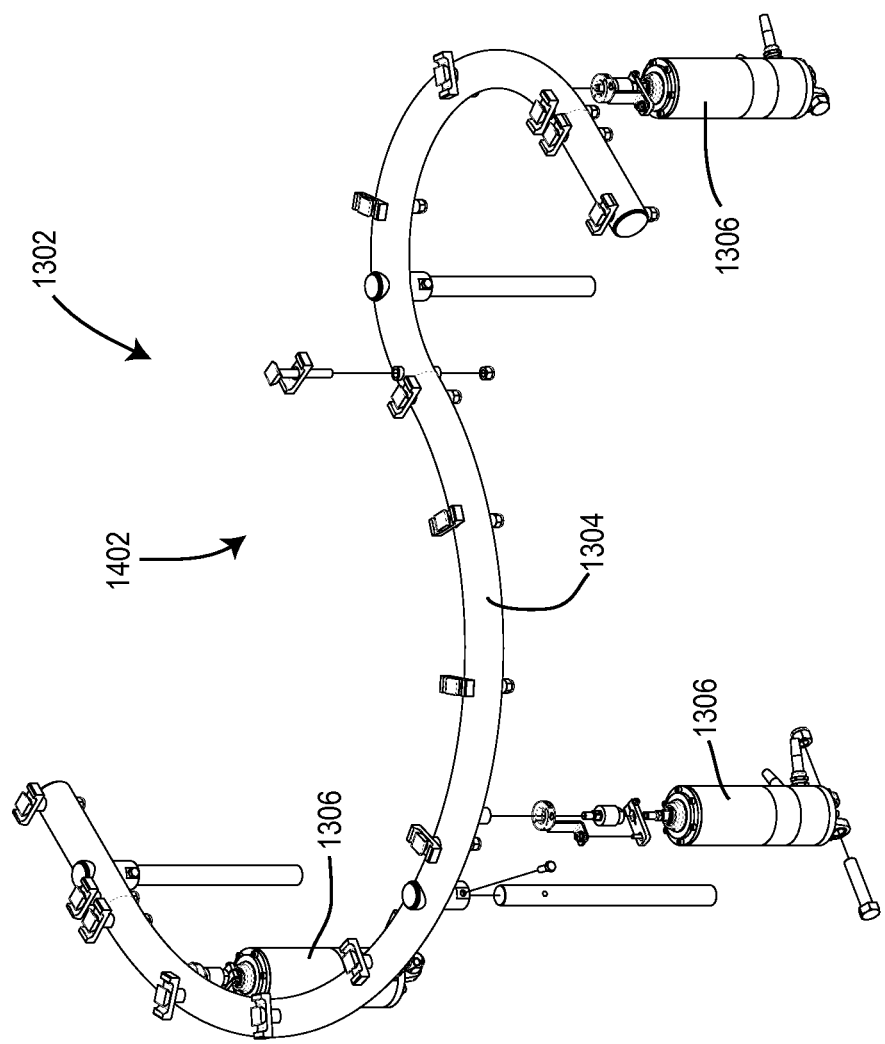
FIG. 14 is a schematic perspective view of a container elevation system in accordance with various embodiments herein.

Referring now to FIG. 14, the container elevation system 1302 includes a rail brace 1304 and a brace actuator 1306. As described previously, the rail brace 1304 can be disposed under or adjacent to the container rail 1202. The rail brace 1304 can be operatively connected to at least a portion of the container rail 1202 such that vertical movement of the rail brace 1304 causes vertical movement of at least a portion of the container rail 1202. In some embodiments, the rail brace 1304 is only connected to a portion of the container rail 1202 such that vertical movement of the rail brace 1304 causes vertical movement of only a portion of the container rail 1202. In some embodiments, the rail brace 1304 can form an S curve 1402. However, it will be appreciated that the rail brace 1304 can also be formed into different shapes. In some embodiments, the rail brace can be formed of a material that resists corrosion. In some embodiments, the rail brace can be formed of stainless steel.

Figure 15:
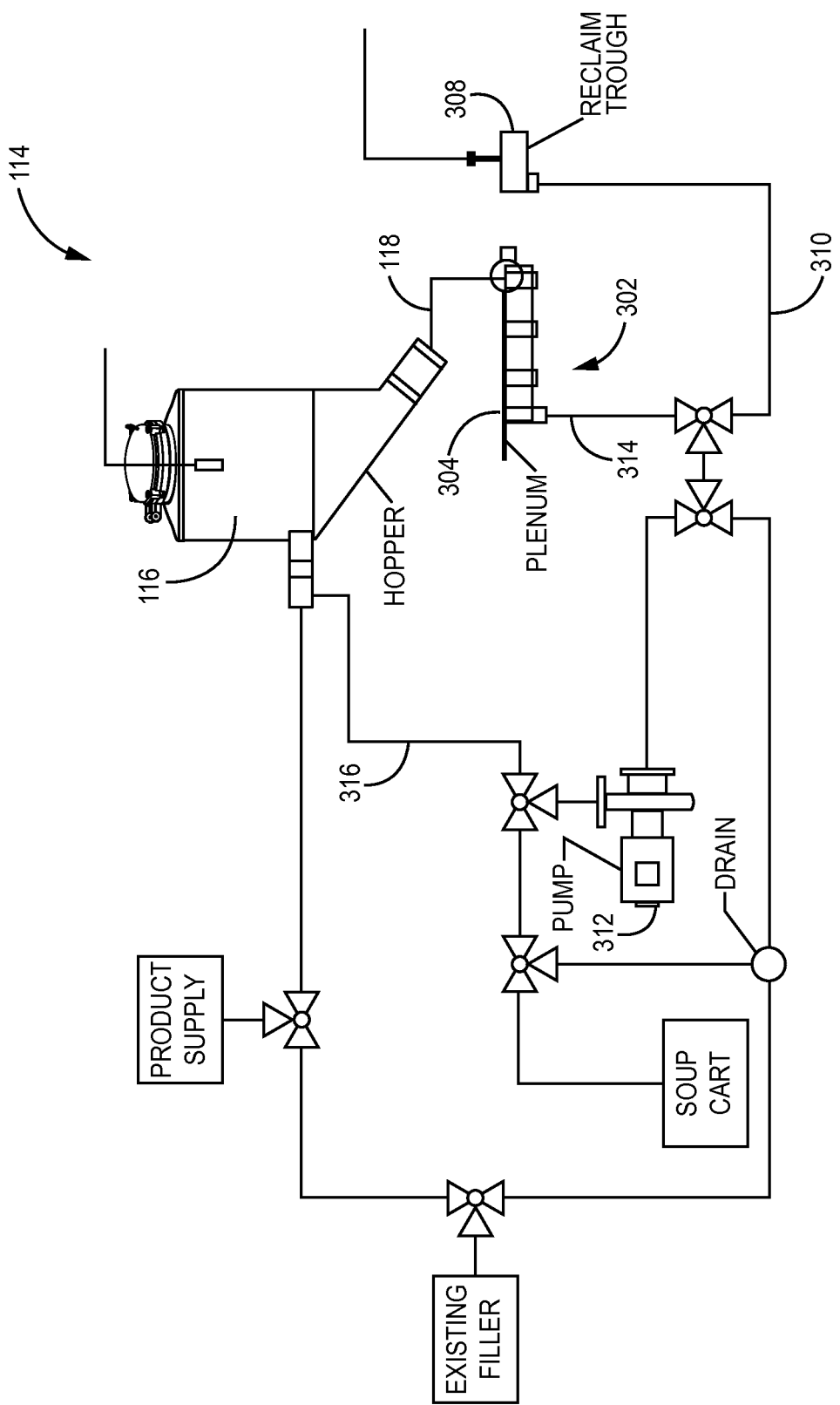
FIG. 15 is a schematic view of elements of a fluid supply group in accordance with various embodiments herein.

FIG. 15 shows a schematic view of elements of a fluid supply group in accordance with various embodiments herein and illustrates a basic flow circuit in accordance with various embodiments herein. The fluid supply group 114 includes a liquid supply tank 116 and a supply conduit 118. Food material can be put into the liquid supply tank 116 to replenish supplies as the food material is placed into containers by the apparatus. The food materials then flow out of the supply tank 116 and through the supply conduit 118. The supply conduit 118 delivers the food materials to a filler plenum assembly 302 that includes a plenum 304. Some of the food material will then be drawn into the hollow columns of the rotary turret assembly (not shown in this view). However, a portion of the food material in the plenum assembly 302 will pass out through a plenum outlet and pass through a plenum return conduit 314 to a pump 312. Also, a portion of food material that is not put into containers can be reclaimed in a reclaim trough 308 and then pass through a reclaim conduit 310 before returning to the pump 312. The pump 312 can then push the food material through a pumped return conduit 314 and directly or indirectly back to the supply tank 116.

Figure 16:
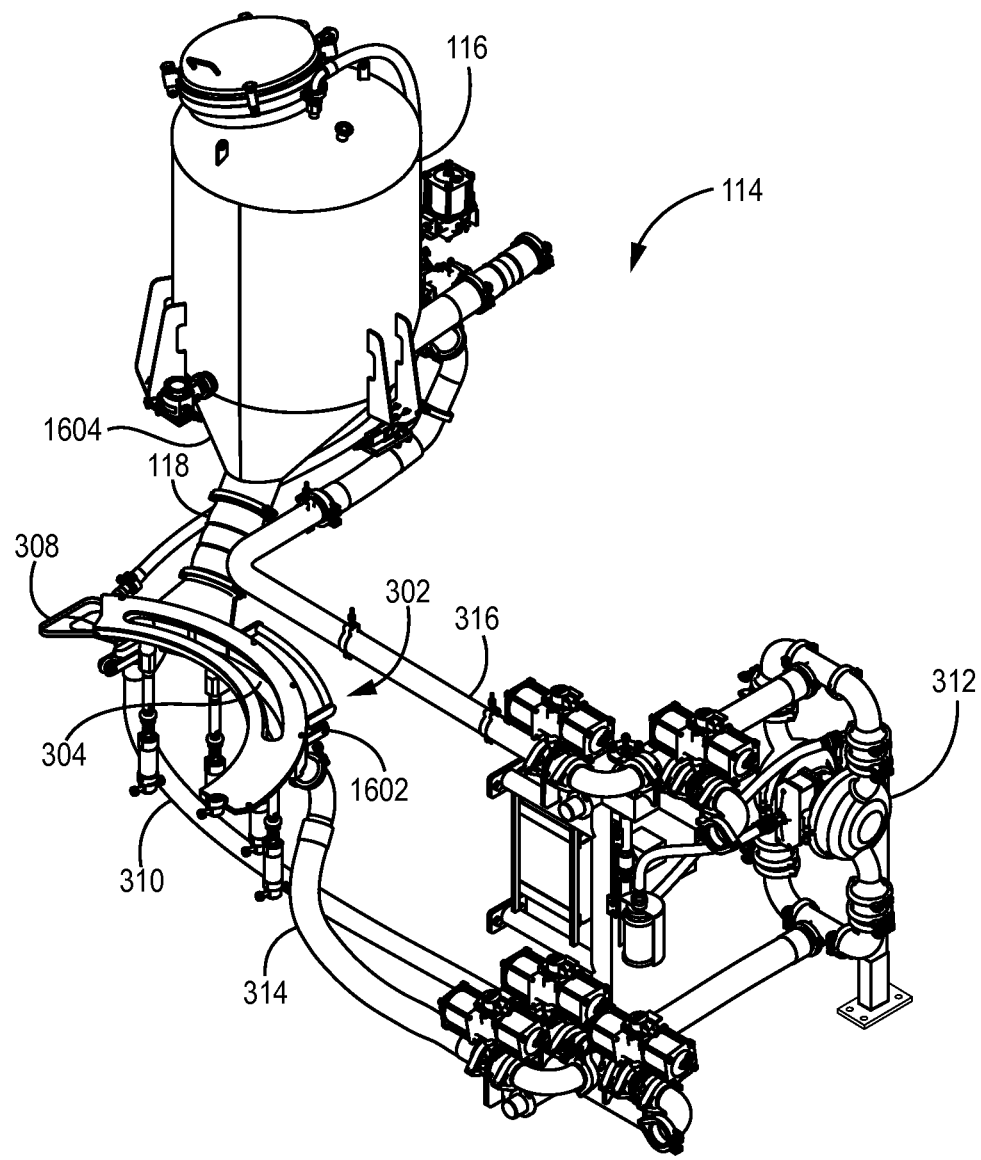
FIG. 16 is a schematic perspective view of a fluid supply group in accordance with various embodiments herein.

Referring now to FIG. 16, the filler plenum assembly 302 includes a plenum 304. The fluid supply group 114 includes a liquid supply tank 116 and a supply conduit 118. The apparatus for filling containers 102 can include a liner 1602. Aspects of the liner 1602 are provided in greater detail below. The fluid supply group 114 can include a reclaim trough 308. The fluid supply group 114 can include a reclaim conduit 310. The fluid supply group 114 can include a pump 312. The fluid supply group 114 can include a plenum return conduit 314. The fluid supply group 114 can include a pumped return conduit 316. The liquid supply tank 116 can include a hopper 1604.

Figure 17:
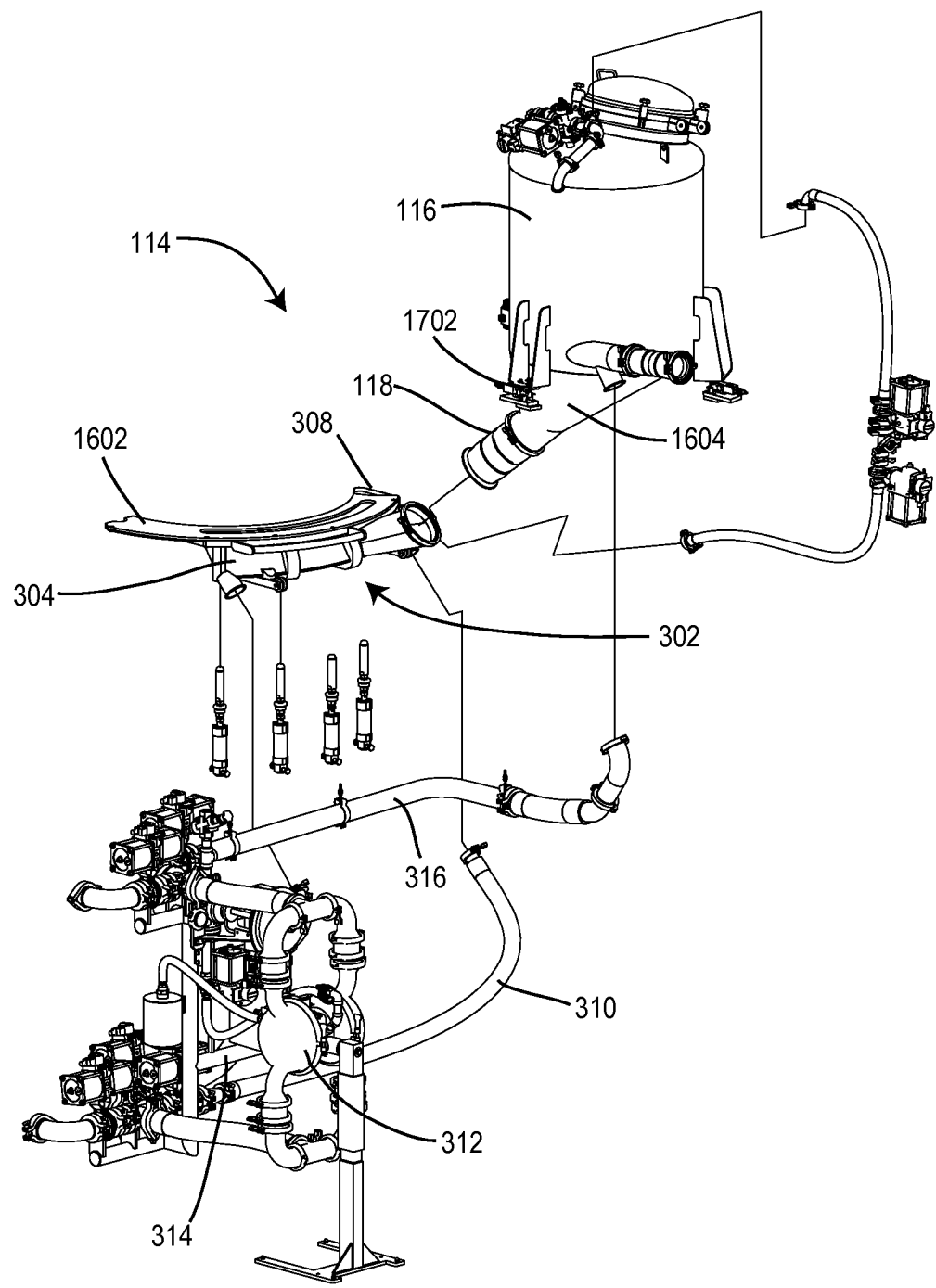
FIG. 17 is an exploded schematic perspective view of a fluid supply group in accordance with various embodiments herein.

Referring now to FIG. 17, the filler plenum assembly 302 includes a plenum 304. The fluid supply group 114 includes a liquid supply tank 116 and a supply conduit 118. The apparatus for filling containers 102 can include a liner 1602. The fluid supply group 114 can include a reclaim trough 308. The fluid supply group 114 can include a reclaim conduit 310. The fluid supply group 114 can include a pump 312. The fluid supply group 114 can include a plenum return conduit 314. The fluid supply group 114 can include a pumped return conduit 316. The liquid supply tank 116 can include a hopper 1604. In some embodiments, the volume sensor 1902 can include a load cell 1702. However, other types of volume sensors can also be used.

Figure 18:
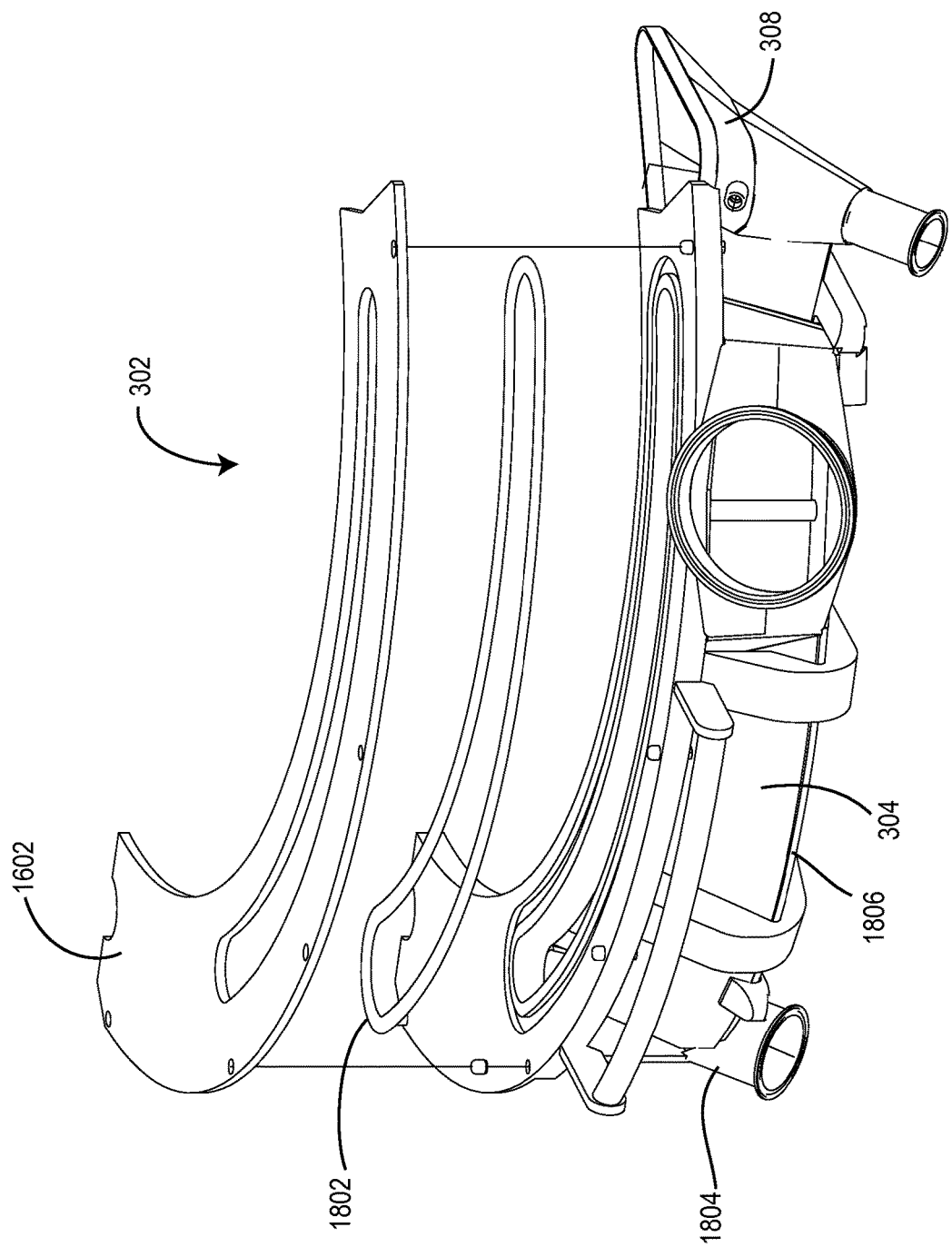
FIG. 18 is an exploded perspective view of a filler plenum assembly in accordance with various embodiments herein.

Referring now to FIG. 18, the filler plenum assembly 302 includes a plenum 304. The apparatus for filling containers 102 can include a liner 1602. The apparatus for filling containers 102 can include a gasket 1802. The fluid supply group 114 can include a reclaim trough 308. The plenum 304 can include a plenum outlet 1804. The plenum 304 can include a bottom surface 1806.

Figure 19:
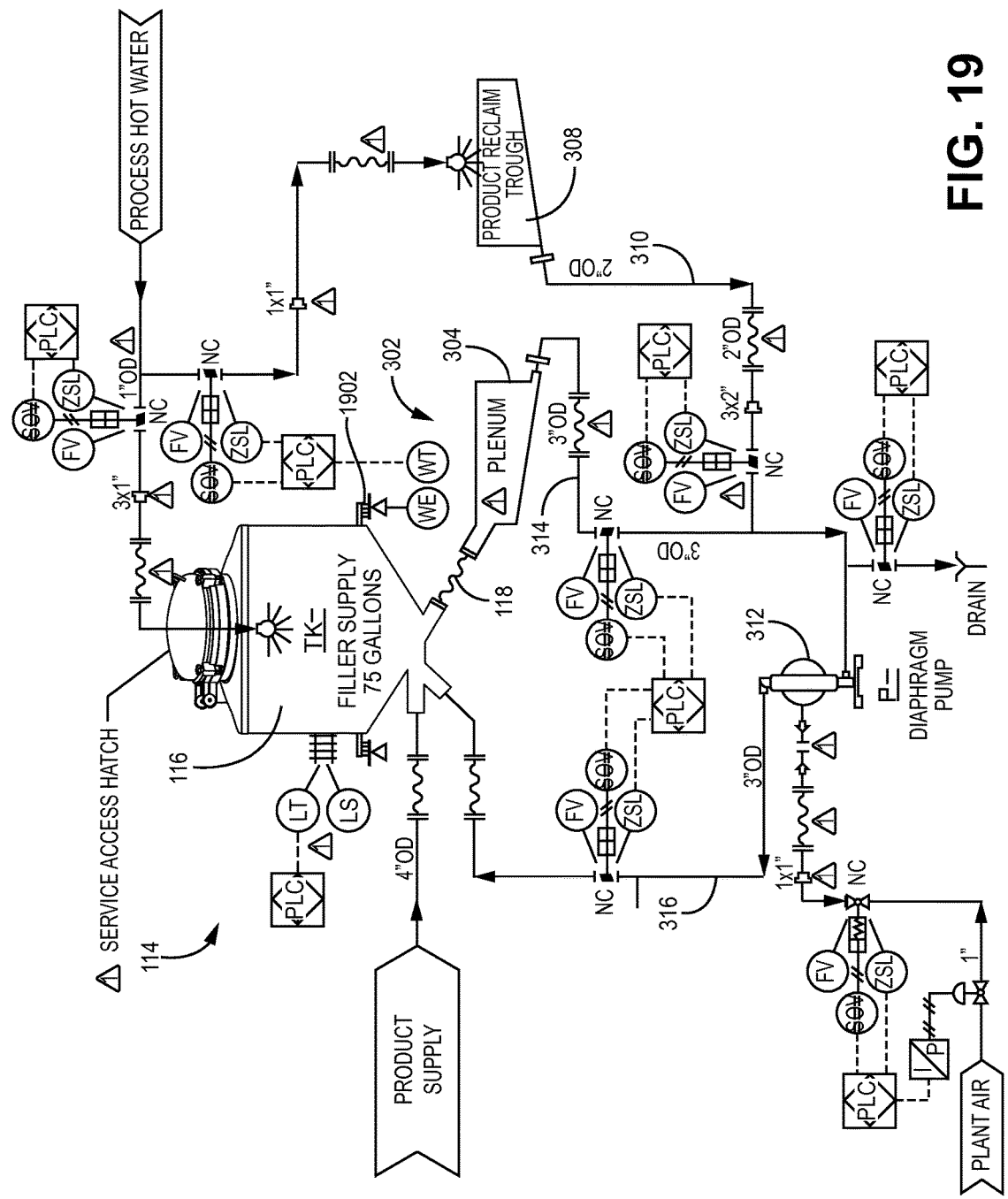
FIG. 19 is a schematic view of elements of a fluid supply group in accordance with various embodiments herein.

Referring now to FIG. 19, the filler plenum assembly 302 includes a plenum 304. The fluid supply group 114 includes a liquid supply tank 116 and a supply conduit 118. The fluid supply group 114 can include a reclaim trough 308. The fluid supply group 114 can include a reclaim conduit 310. The fluid supply group 114 can include a pump 312. The fluid supply group 114 can include a plenum return conduit 314. The fluid supply group 114 can include pumped a return conduit 316. The liquid supply tank 116 can include volume sensor 1902.

The apparatus for filling containers can include a motor. The motor can be operably connected to the rotary turret assembly. The rotary turret assembly can be rotated at a rotational speed of about 0.5 RPM to about 25 RPM. In some embodiments, the rotary turret assembly can be rotated at a rotational speed 10 RPM to about 20 RPM.

In some embodiments, the cam contact member can include a cam roller. In other embodiments, the cam contact member can include a cam slider. It will be appreciated that various other elements could be used for the contact member.

The rotary base can include a plurality of apertures aligned with the plurality of hollow columns. In some embodiments, the plurality of hollow columns are removable from the rotary base. In some embodiments, the plurality of hollow columns are press fit into the apertures in the rotary base. In some embodiments, the plurality of hollow columns are bolted onto the rotary base. In some embodiments, there can be from about 10 to about 120 hollow columns. In some embodiments, there can be about 24 to 84 hollow columns. In some embodiments, there can be about 30 to 42 hollow columns. In some embodiments, there are 36 hollow columns. In some embodiments, there are about 45 hollow columns. In some embodiments, there can be about 40 to 70 hollow columns.

It will be appreciated that the rotary base can be of different sizes depending factors such as the desired capacity and speed of the apparatus. In some embodiments, the rotary base can have a diameter of about 36 inches to 108 inches. In some embodiments, the rotary base can have a diameter of about 36 inches to 72 inches. In some embodiments, the rotary base can have a diameter of about 48 inches to 60 inches.

In some embodiments, the apparatus can accommodate the filling of 60 containers per minute or more, 100 containers per minute or more, 200 containers per minute or more, 300 containers per minute or more, 500 containers per minute or more, 700 containers per minute or more, 900 containers per minute or more, 1200 containers per minute or more, or 1500 containers per minute or more. Pumps used herein can have a capacity sufficient to accommodate the desired filling capacities.

The apparatus for filling containers can include a liner. The liner can be disposed between the plenum and the rotary base. The liner can have properties that are ideal for creating a seal between the bottom of the rotary base and the plenum. In some embodiments, the liner is somewhat flexible and can deform slightly under pressure. In some embodiments, the liner can undergo plastic deformation and then return to its original shape. Liners can be made from various materials including various metals (or alloys thereof), composites, ceramics, polymers and the like. In some embodiments, the liner can be formed of a high density polymer. In some embodiments, the liner can include X-ray detectable material, such as a barium containing material or the like.

The apparatus for filling containers can include a gasket. The gasket can be disposed between the plenum and the liner. In various embodiments the gasket can be deformable under pressure and can include a polymeric material. In some embodiments, the gasket can include an elastomeric polymer.

The piston assemblies can include a piston body. The piston body can be made from a material that resists corrosion such as, but not limited to, various metals or alloys, polymers, composites, ceramics, or the like.

The piston body can include a bottom. The piston body can include one or more piston rings. The piston rings can be disposed around the piston body adjacent the bottom. The piston rings can aid in creating a seal between the bottom of the piston body and the inner diameter of the hollow columns. The piston rings can be made of various materials. In some embodiments, the piston rings can include a polymer. In some embodiments, the piston rings can include X-ray detectable material.

In some embodiments, the piston body can have an outer diameter of about 1 inch to about 4 inches at its widest point. In some embodiments, the piston body can have an outer diameter of about 2 inches to about 3 inches at its widest point. In some embodiments, the piston body can have an outer diameter of about 2.375 inches at its widest point.

The plurality of hollow columns can include a channel. The channel can extend from the top of the hollow columns downward to a point on the hollow columns. In some embodiments, the channel can extend downward to a vertical point on or near the middle of the hollow columns. The piston assemblies can include a shaft. The shaft can connect the cam contact member and the top hat assembly. The shaft can provide a connection between the top hat assembly of the piston assemblies and the cam contact member. Specifically, the shaft can move up and down within the channel in the hollow columns.

The apparatus for filling containers can include an infeed timing screw and a discharge timing screw. The timing screws can have various pitches depending on the size of containers to be used and the desired spacing in between containers.

The container elevation system can include a container rail (or track or belt). Containers can move along the container rail. In various embodiments, the container rail can be disposed over the rail brace. In some embodiments, the brace actuator can move the rail brace and therefore can move at least a portion of the container rail. In some embodiments, the brace actuator can move the rail brace up to 6 inches vertically. In some embodiments, the brace actuator can move the rail brace up to 4 inches vertically. In various embodiments, movement of the brace actuator does not change the height of the infeed timing screw or the discharge timing screw. In various embodiments, movement of the brace actuator does not change the height of the reversing wheel.

In various embodiments, the apparatus for filling containers includes a fluid supply group. The fluid supply group can include a liquid supply tank, a supply conduit, a reclaim trough, a reclaim conduit, a plenum assembly, a plenum return conduit, a pump, and a pumped return conduit. Conduits used herein can be made of various materials (including, but not limited to, polymers, metals and the like)

and have various diameters and lengths. It will be appreciated that the fluid supply group can also include other components such as valves, flow sensors, control interfaces and the like.

The supply conduit can provide fluid communication between the liquid supply tank and the plenum. The reclaim conduit can provide fluid communication between the reclaim trough and the pump. The plenum return conduit can provide fluid communication between the plenum outlet and the pump. The pumped return conduit can provide fluid communication between the pump and the liquid supply tank. It will also be appreciated that to the extent that it is described that food materials can be conveyed from one component to another (or that one component is in fluid communication with another), that such conveyance or communication can either be direct or indirect in it is possible to include other components in between such as additional conduits, valves, and the like.

The fluid supply group can include a pump. The pump can be of various types. In some embodiments, can be a peristaltic type pump. In various embodiments, the pump can be electrically driven. In some embodiments the pump can be pneumatically or hydraulically driven. In some embodiments, the apparatus can include more than one pump. In some embodiments, the fluid supply group can include more than one pump. In some embodiments, the apparatus can include a pump as part of something other than the fluid supply group.

In some embodiments, the liquid supply tank can have a volume of about 5 gallons to about 500 gallons. In some embodiments, the liquid supply tank can have a volume of about 25 gallons to about 200 gallons. The liquid supply tank can include a hopper. In some embodiments, the liquid supply tank can include a volume sensor. It will be appreciated that volume can be sensed in various ways and thus many different types of volume sensors can be used. In some embodiments, the volume sensor can include a load cell.

The plenum can include a plenum outlet. The plenum can include a bottom surface. The bottom surface can be sloped downwardly to the plenum outlet.

It will be appreciated that while not shown herein, the rotary filling apparatus of various embodiments can include a control module including, but not limited to, control circuitry that can be used to execute operations of methods herein as well as control operational aspects of the apparatus including, but not limited to, operation of the actuators, motors, and pumps of the apparatus.

Methods

It will be appreciated that embodiments herein can include various methods. In an embodiment, the invention includes a method for filling containers. The method for filling containers can include rotating a rotary turret assembly, the rotary turret assembly comprising a rotary base and a plurality of hollow columns mounted on the rotary base and arranged in a circle. The method can include contacting a cam contact member against a cam track to cause the piston assemblies disposed within the hollow columns to move up and down. The method can further include drawing a food material into a bottom portion of the hollow columns when the piston assemblies move up and dispensing the food material into a container when the piston assemblies move down. The method for filling containers can include drawing the food material upward from a plenum.

In various embodiments of the method, the amount of the food material drawn into the hollow column exceeds the amount dispenses into the container. By way of example, the method for filling containers can include purging a portion of the food material when the piston assemblies move down prior to dispensing the food material into the container. The method for filling containers can include a purging the food material downward into a plenum. The method for filling containers can include holding the food material in the bottom of the hollow column after purging a portion of the food material and before dispensing the food material.

While not intending to be bound by theory, it is believed that overfilling the hollow columns followed by purging a portion prior to filling of the containers results in in enhanced consistency in terms of both the total amount of product that is filled into containers as well as the relative amounts of the liquid portion of the food product compared to the particulate portions of the food product (when the food product includes particulate materials).

Figure 20:
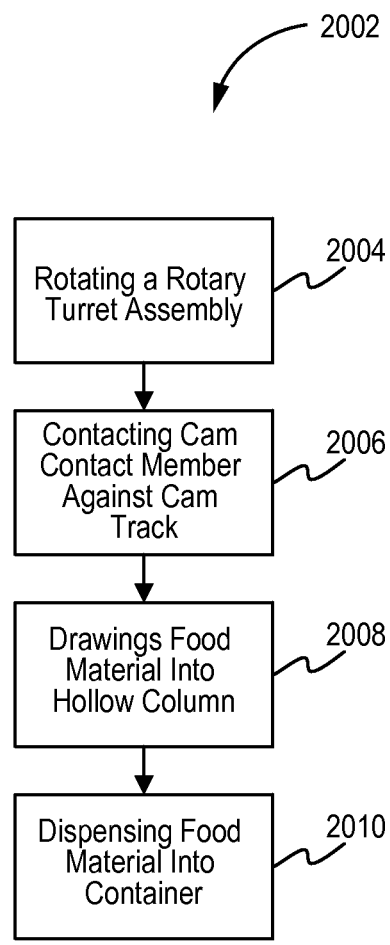
FIG. 20 is a flow chart of a method in accordance with various embodiments herein.

Referring now to FIG. 20, the method for filling containers 2002 includes rotating a rotary turret assembly, the rotary turret assembly comprising a rotary base and a plurality of hollow columns mounted on the rotary base and arranged in a circle 2004, contacting a cam contact member against a cam track to cause piston assemblies disposed within the hollow columns to move up and down 2006, drawing a food material into a bottom portion of the hollow columns when the piston assemblies move up 2008, and dispensing the food material into a container when the piston assemblies move down 2010.

It will be appreciated that there may be occasions in which a container is missing from the sequence of containers being fed into the rotary turret assembly. In various embodiments, methods are included that provide for a way of not filling the hollow column with a food material when there is not a container to be filled in alignment with the particular hollow column of the rotary turret assembly.

In an embodiment, the invention includes a method for filling containers including rotating a rotary turret assembly. The method for filling containers can include detecting whether a container to be filled is aligned with a particular hollow column and engaging a release lever that allows a top hat assembly to release from a piston body assembly if a container is not detected. The method can further include contacting a cam contact member operably connected to the top hat assembly against a cam track to cause the top hat assembly disposed within the hollow columns to move up and down. The method can further include drawing a food material into a bottom portion of the hollow columns when the piston body assemblies move up if the top hat assembly is not released from the piston body assembly and dispensing the food material into a container when the piston body assemblies move down if the top hat assembly is not released from the piston body assembly.

Figure 21:
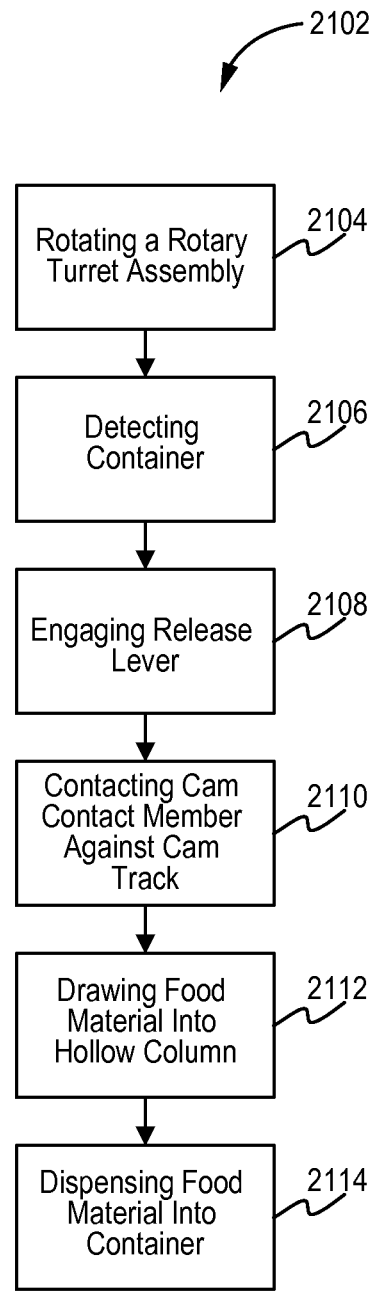
FIG. 21 is a flow chart of a method in accordance with various embodiments herein.

Referring now to FIG. 21, the method for filling containers 2102 includes rotating a rotary turret assembly, the rotary turret assembly comprising a rotary base and a plurality of hollow columns mounted on the rotary base and arranged in a circle 2104, detecting whether a container to be filled is aligned with a particular hollow column 2106, engaging a release lever that allows a top hat assembly to release from a piston body assembly if a container is not detected, the top hat assembly and the piston body assembly disposed in the hollow columns 2108, contacting a cam contact member operably connected to the top hat assembly against a cam track to cause the top hat assembly disposed within the hollow columns to move up and down 2110, drawing a food material into a bottom portion of the hollow columns when the piston body assemblies move up if the top hat assembly is not released from the piston body assembly 2112, and dispensing the food material into a container when the piston body assemblies move down if the top hat assembly is not released from the piston body assembly 2114.

It will be appreciated that it is useful to be able to reconfigure the apparatus for filling containers so as to accommodate various size containers. In particular, different size containers may have different heights. However, it can be difficult to adjust the height of particularly large pieces of equipment such as the rotary turret assembly. As such, in various embodiments herein, a rail upon which the containers travel can be moved vertically up and down so that the top of the containers matches the appropriate height for the rotary turret assembly without the need to adjust the height of the rotary turret assembly.

In an embodiment, the invention includes a method for filling containers. The method for filling containers can include rotating a rotary turret assembly, the rotary turret assembly comprising a rotary base and a plurality of hollow columns mounted on the rotary base and arranged in a circle, feeding containers to be filled into an infeed timing screw, passing the containers over a container rail, wherein the container rail is disposed adjacent the infeed timing screw, adjusting the height of the containers and container rail relative to the rotary turret.

Figure 22:
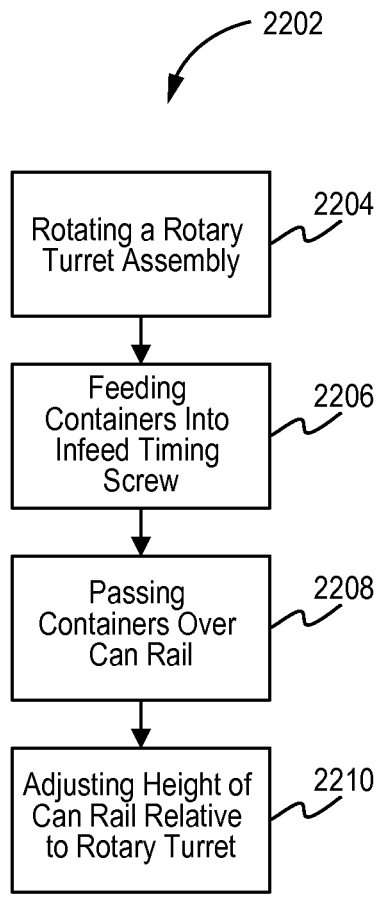
FIG. 22 is a flow chart of a method in accordance with various embodiments herein.

Referring now to FIG. 22, the method for filling containers 2202 includes rotating a rotary turret assembly, the rotary turret assembly comprising a rotary base and a plurality of hollow columns mounted on the rotary base and arranged in a circle 2204, feeding containers to be filled into an infeed timing screw 2206, passing the containers over a container rail, wherein the container rail is disposed adjacent the infeed timing screw 2208, adjusting the height of the containers and container rail relative to the rotary turret and the infeed timing screw 2210.

While not intending to be bound by theory, it is believed that there are advantages associated with recirculating food material in a closed loop system. In addition, it will be appreciated that a need may arise from time to time to temporarily stop the filling operation. If food material is stagnant during these temporary stoppages, there may be a need to purge all food material in the apparatus before restarting the filling operation due to aspects which may occur such as settling of components of the food material which may result in reduced consistency or even, in some cases, a degrees of phase separation of different components within the food material. In various embodiments herein, the food material can be recirculated so as to maintain the food material in a condition for filling of containers.

In an embodiment, the invention includes a method for filling containers including delivering a food product to a plenum disposed under a portion of the rotary turret assembly by conveying the food product from a liquid supply tank through a supply conduit to the plenum. The method can further include drawing a first portion of the food product from the plenum into the hollow columns for dispensing into containers to be filled. The method can further include collecting a second portion of the food product disposed in the plenum and conveying the collected food product through an outlet in the plenum and to a pump. The method can further include conveying the collected food product from the pump back to the liquid supply tank.

In some embodiments, the method for filling containers can also include collecting a third portion of the food product in a reclaim trough disposed adjacent the plenum. The method for filling containers can include conveying the collected third portion to the pump.

In some embodiments, the method can include continuing to collect the second portion of the food product and conveying the collected food product from the pump back to the liquid supply tank even when the step of drawing a first portion of the food product from the plenum into the hollow columns for dispensing into containers to be filled is temporarily ceased.

Figure 23:
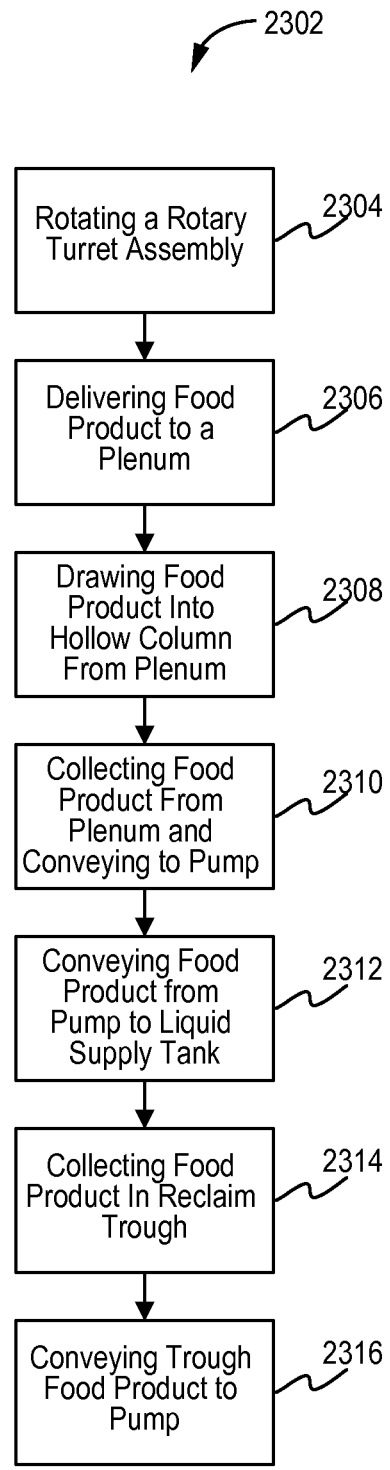
FIG. 23 is a flow chart of a method in accordance with various embodiments herein.

Referring now to FIG. 23, the method for filling containers 2302 includes rotating a rotary turret assembly, the rotary turret assembly comprising a rotary base and a plurality of hollow columns mounted on the rotary base and arranged in a circle 2304, delivering a food product to a plenum disposed under a portion of the rotary turret assembly by conveying the food product from a liquid supply tank through a supply conduit to the plenum 2306, drawing a first portion of the food product from the plenum into the hollow columns for dispensing into containers to be filled 2308, collecting a second portion of the food product disposed in the plenum and conveying the collected food product through an outlet in the plenum and to a pump 2310, and conveying the collected food product from the pump back to the liquid supply tank 2312. The method for filling containers 2302 can include collecting a third portion of the food product in a reclaim trough disposed adjacent the plenum 2314. The method for filling containers 2302 can include conveying the collected third portion to the pump 2316.

It should be noted that, as used in this specification and the appended claims, the singular forms 'a,' 'an,' and 'the' include plural referents unless the content clearly dictates otherwise. Thus, for example, reference to a composition containing 'a compound' includes a mixture of two or more compounds. It should also be noted that the term 'or' is generally employed in its sense including 'and/or' unless the content clearly dictates otherwise.

It should also be noted that, as used in this specification and the appended claims, the phrase 'configured' describes a system, apparatus, or other structure that is constructed or configured to perform a particular task or adopt a particular configuration to. The phrase 'configured' can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

The invention claimed is:

1. An apparatus for filling containers comprising:
   a filler frame;
   a rotary turret assembly rotatably coupled to the filler frame, the rotary turret assembly comprising a rotary base and a plurality of hollow columns mounted on the rotary base and arranged in a circle;
   a filler plenum assembly underlying a portion of the rotary turret assembly, the filler plenum assembly comprising a plenum, wherein the plenum is in fluid communication with the hollow columns for a portion of each rotation of the rotary turret assembly;
   a plurality of piston assemblies disposed in the hollow columns, wherein the piston assemblies can move up and down within the hollow columns, each piston assembly comprising a cam contact member;

a cam track operably connected to the filler frame; wherein rotation of the rotary turret assembly causes the cam contact members of the piston assemblies to move over a surface of the cam track causing vertical movement of the piston assemblies relative to the hollow columns in which they are disposed;

wherein the cam track surface comprises a first rising portion corresponding to a filling phase, a second rising portion corresponding to an overfilling phase; a first declining portion corresponding to a purging phase; a first flat portion corresponding to a hold phase; and a second declining portion corresponding to a dispensing phase; and a fluid supply group in fluid communication with the plenum, the fluid supply group comprising a liquid supply tank, and a supply conduit providing fluid communication between the liquid supply tank and the plenum.

2. The apparatus for filling containers of claim 1, wherein the vertical distance covered by the first rising portion is the same as the second declining portion.

3. The apparatus for filling containers of claim 1, wherein the vertical distance covered by the second rising portion is the same as the first declining portion.

4. The apparatus for filling containers of claim 1, wherein the horizontal distance covered by the first flat portion is about 20 to 60 percent of the horizontal distance covered by the first rising portion and the second rising portion combined.

5. The apparatus for filling containers of claim 1, wherein the vertical distance covered by the first declining portion is equal to at least about 5% of the vertical distance covered by the second declining portion.

6. The apparatus for filling containers of claim 1, wherein the first rising portion and the second rising portion together cause the piston to move up in the hollow column such that a volume of about 50 ml to about 3000 ml of a liquid food material is drawn into a bottom portion of the hollow column.

7. The apparatus for filling containers of claim 1, wherein the slope of the first rising portion is greater than the absolute value of the slope of the second declining portion.

8. The apparatus for filling containers of claim 1, further comprising a motor operably connected to the rotary turret assembly configured to rotate the rotary turret assembly at a rotational speed of about 0.5 RPM to about 25 RPM.

9. The apparatus for filling containers of claim 1, comprising from about 10 to about 120 hollow columns.

10. The apparatus for filling containers of claim 1, further comprising an actuator operably connected to the cam track configured to raise or lower at least a portion of the cam track.

11. The apparatus for filling containers of claim 1, further comprising a liner disposed between the plenum and the rotary base.

12. The apparatus for filling containers of claim 1, the liner comprising an X-ray detectable material.

13. The apparatus for filling containers of claim 1, further comprising a gasket disposed between the plenum and the liner.

* * * * *